United States Patent
Nagahara et al.

(10) Patent No.: US 7,672,062 B2
(45) Date of Patent: Mar. 2, 2010

(54) PROJECTION ZOOM LENS AND PROJECTION TYPE DISPLAY DEVICE

(75) Inventors: Akiko Nagahara, Saitama (JP);
Kimiaki Nakazawa, Saitama (JP);
Hiroshi Yamada, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/277,108

(22) Filed: Nov. 24, 2008

(65) Prior Publication Data

US 2009/0135496 A1    May 28, 2009

(30) Foreign Application Priority Data

Nov. 26, 2007    (JP)    ............................ P2007-304317

(51) Int. Cl.
*G02B 15/14* (2006.01)
(52) U.S. Cl. ........................ 359/676; 359/679; 359/683
(58) Field of Classification Search ................. 359/676, 359/679, 683
See application file for complete search history.

(56) References Cited

U.S. PATENT DOCUMENTS 7,548,378 B2 *    6/2009    Kawakami et al. .......... 359/676
2009/0135485 A1 *    5/2009    Ohtake ....................... 359/557

FOREIGN PATENT DOCUMENTS

JP    8-201690 A    8/1996
JP    2002-122782 A    4/2002

* cited by examiner

*Primary Examiner*—Scott J Sugarman
(74) *Attorney, Agent, or Firm*—Birch, Stewart, Kolasch & Birch, LLP

(57) ABSTRACT

A projection zoom lens is provided and includes: in order from the magnification side, a positive first lens group performing focusing with being fixed during power-varying and having a focusing function; a negative second lens group, a negative third lens group, and a positive fourth lens group, which are moved with correlation during the power-varying; and a positive fifth lens group $G_5$ fixed during the power-varying. An aperture diaphragm is fixed between the fourth lens group and the fifth lens group during the power-varying. In addition, the expression of $1.7<Bf/f<3.0$ is satisfied, where f is a focal length of the whole system, and Bf is a back focal length (air conversion distance) of the whole system.

17 Claims, 16 Drawing Sheets

FIG. 1　EXAMPLE 1 (WIDE)

EXAMPLE 1

EXAMPLE 2 (WIDE)

EXAMPLE 2

EXAMPLE 3 (WIDE)

EXAMPLE 3

FIG. 7  EXAMPLE 4 (WIDE)

FIG. 8
EXAMPLE 4
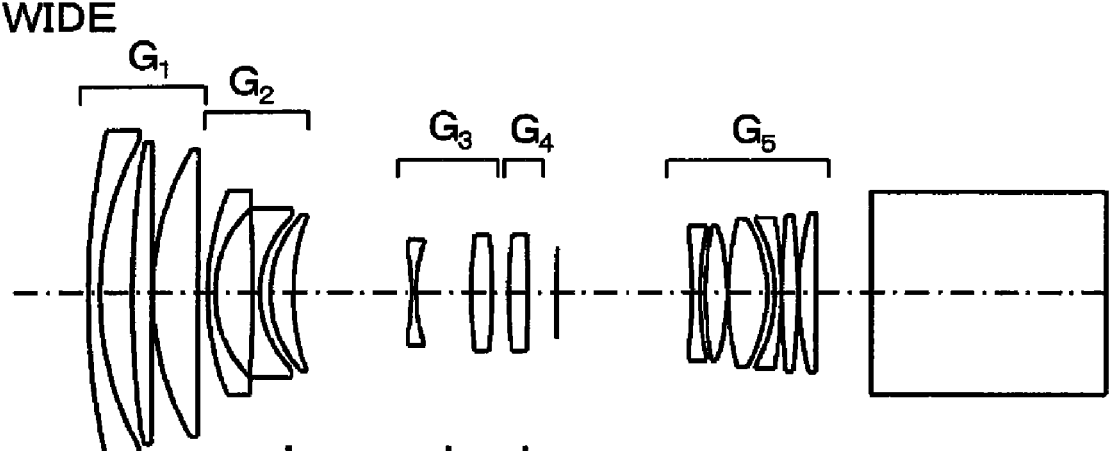
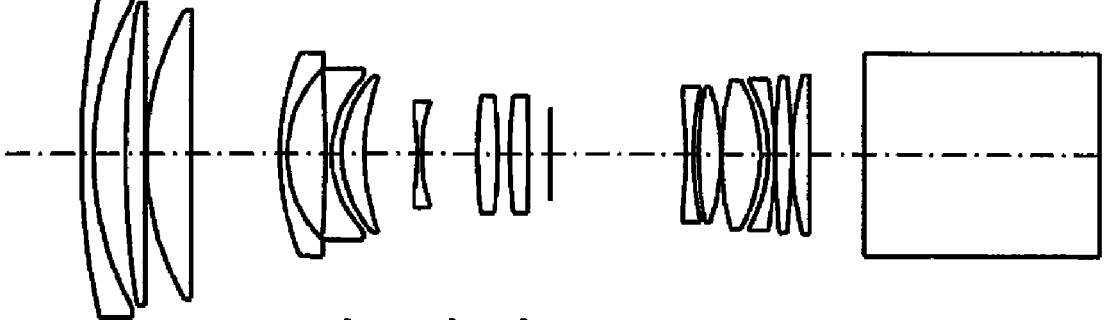
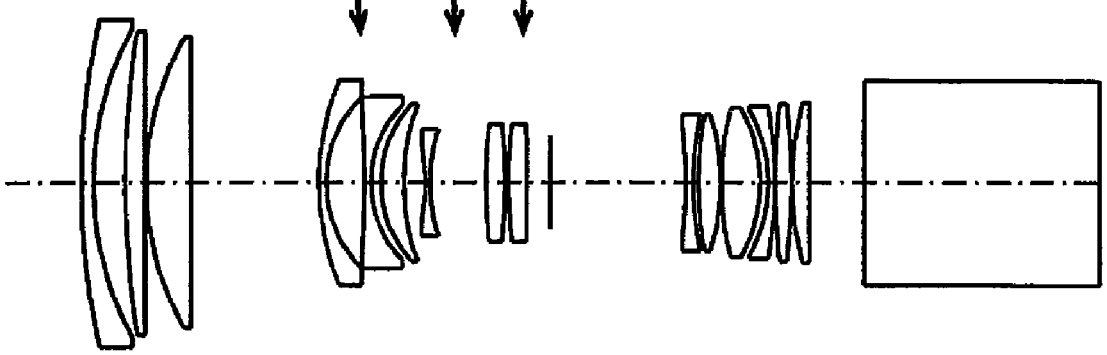

EXAMPLE 5 (WIDE)

FIG. 10
EXAMPLE 5
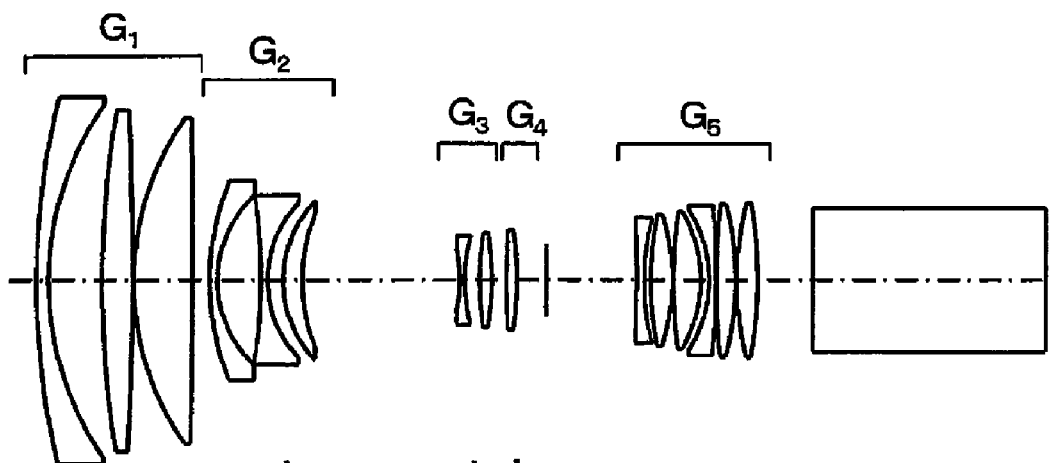
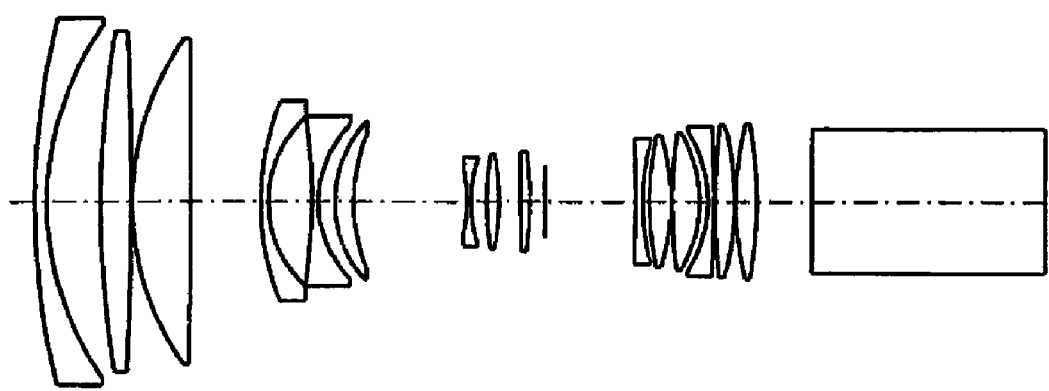
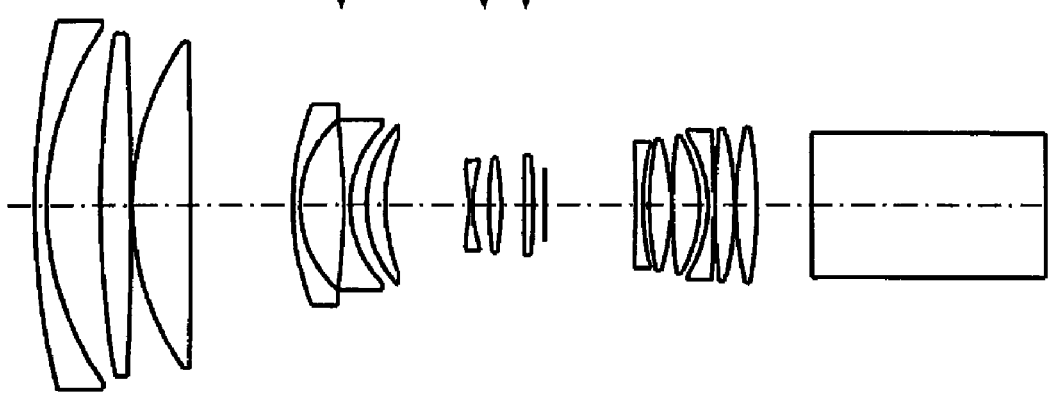

FIG. 11
EXAMPLE 1
(WIDE)
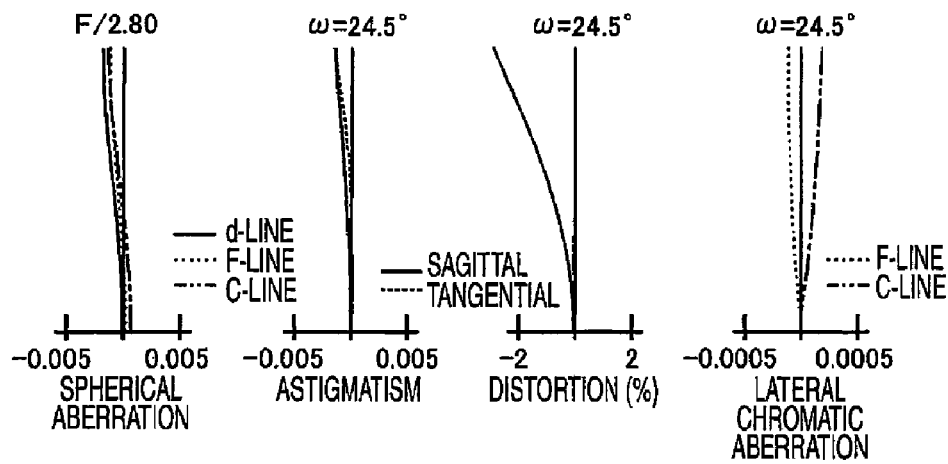
(MIDDLE)
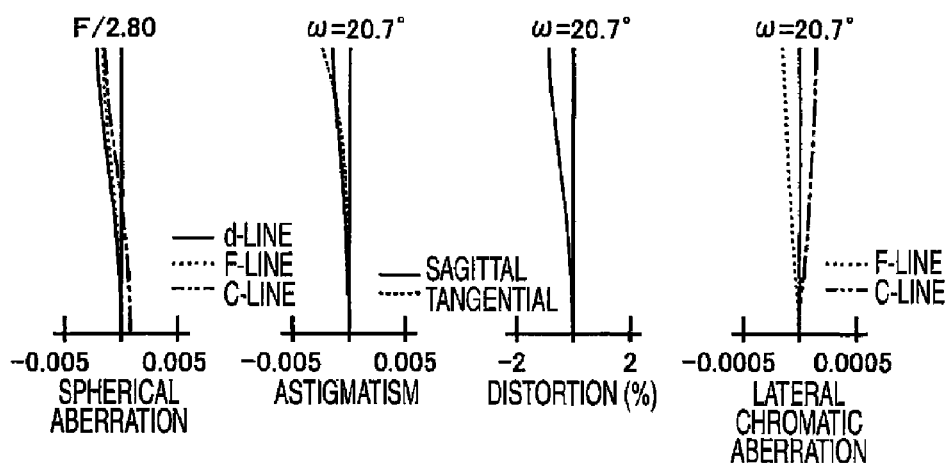
(TELE)
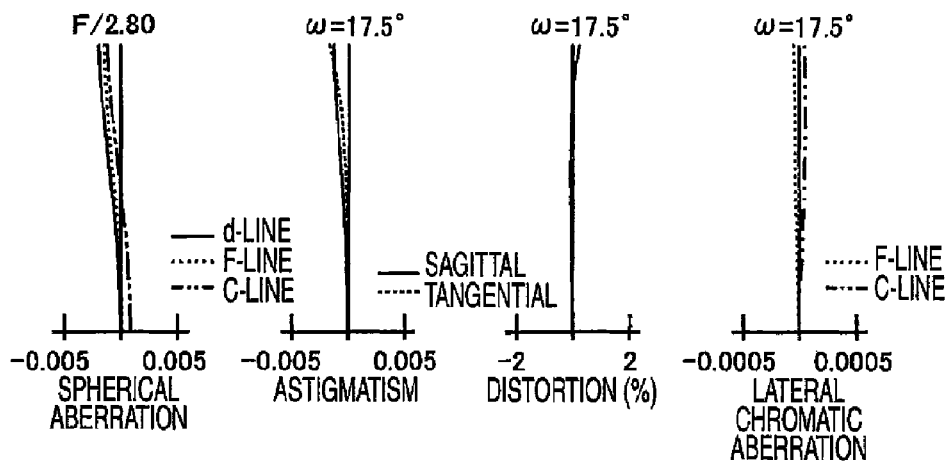

FIG. 12
EXAMPLE 2
(WIDE)
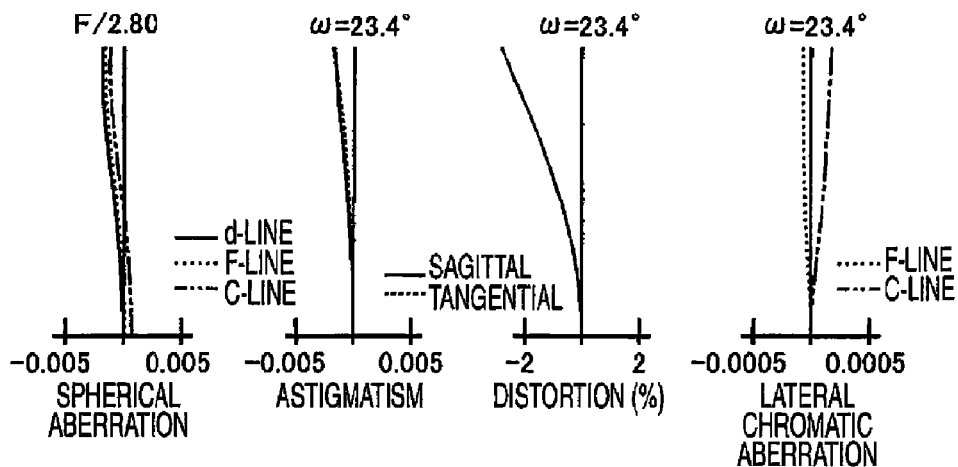
(MIDDLE)
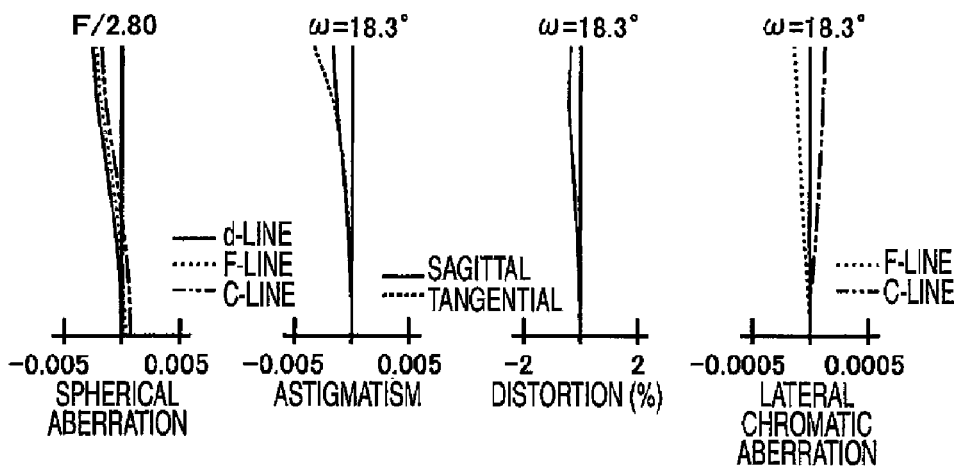
(TELE)
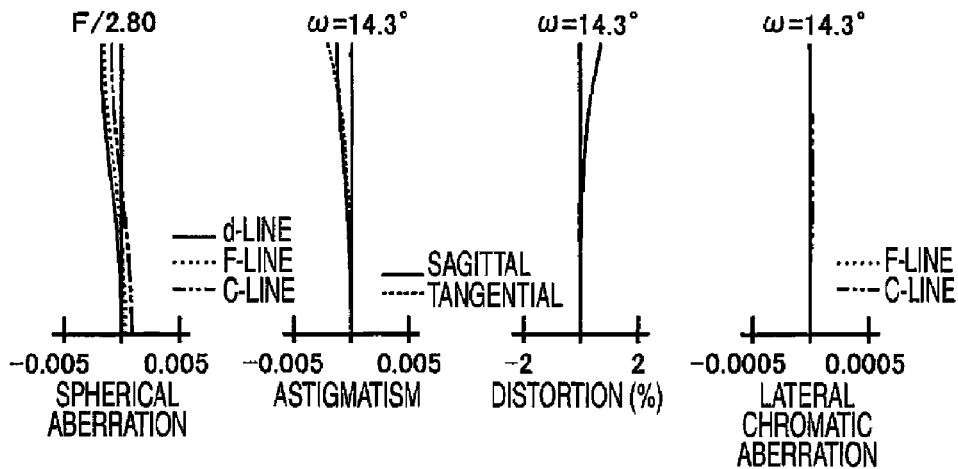

FIG. 13
EXAMPLE 3
(WIDE)
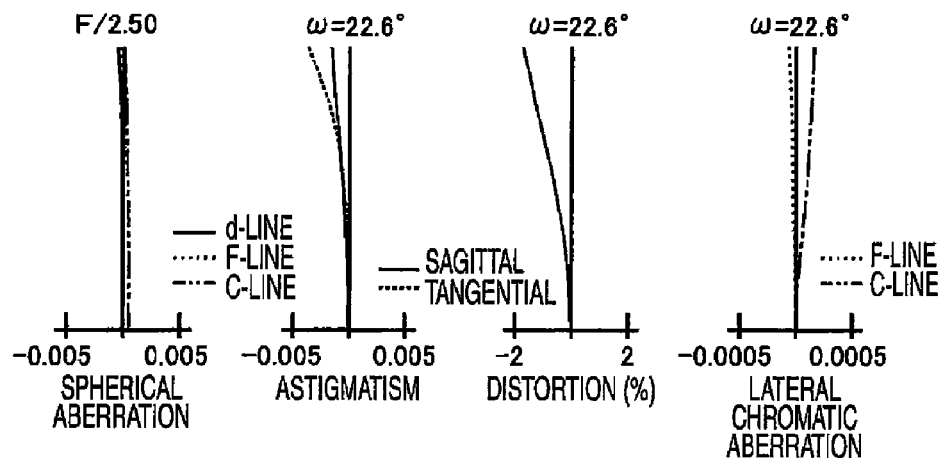
(MIDDLE)
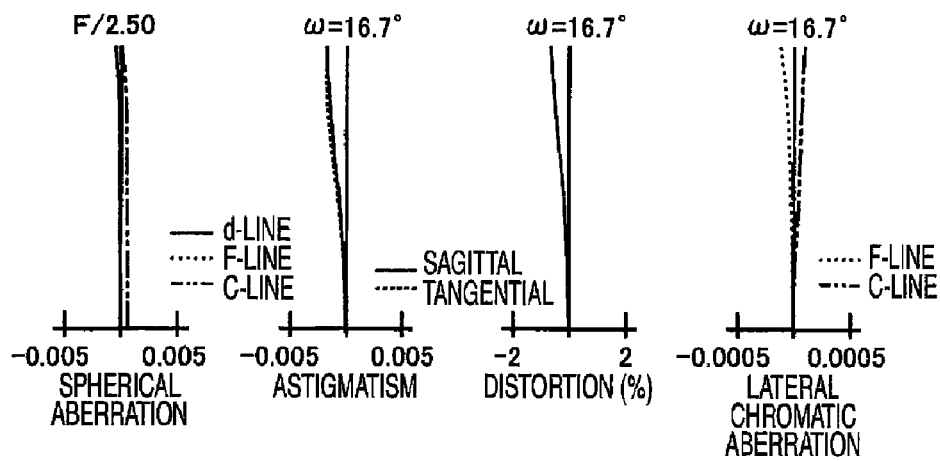
(TELE)
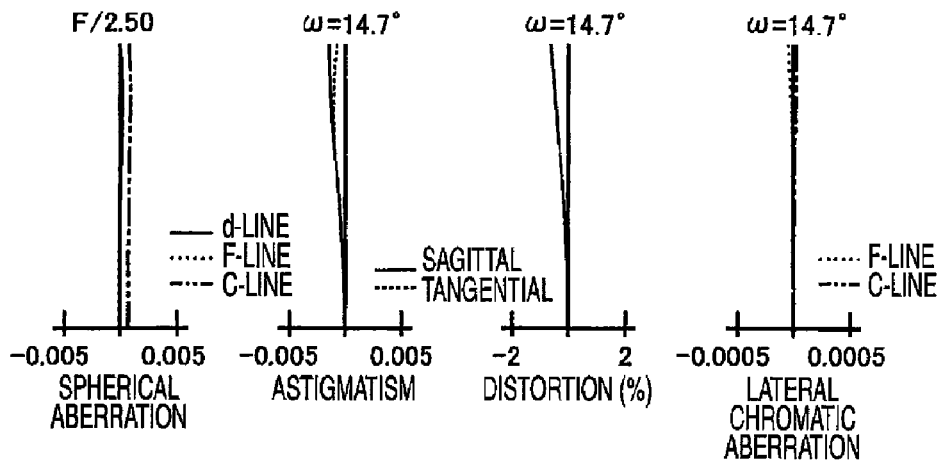

FIG. 14
EXAMPLE 4
(WIDE)
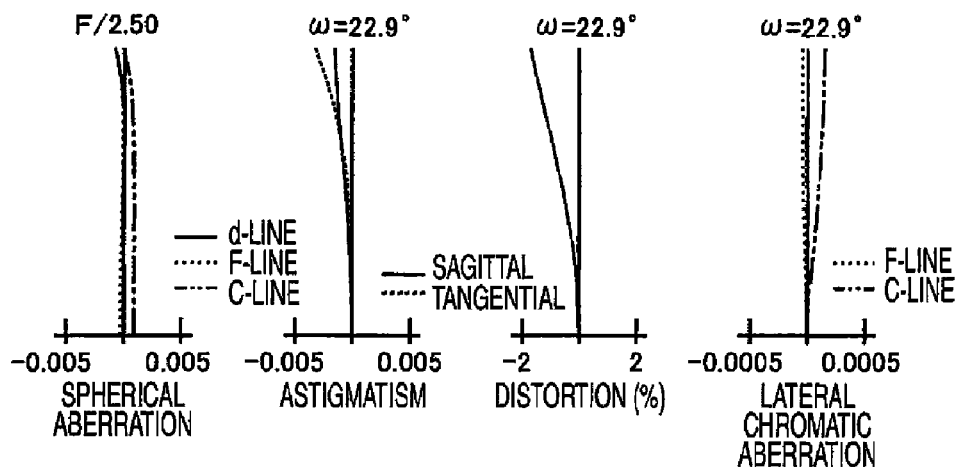
(MIDDLE)
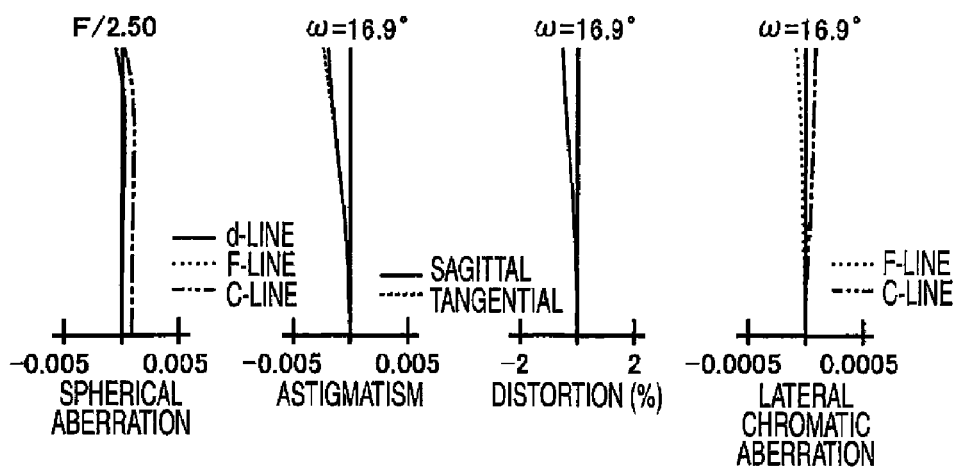
(TELE)
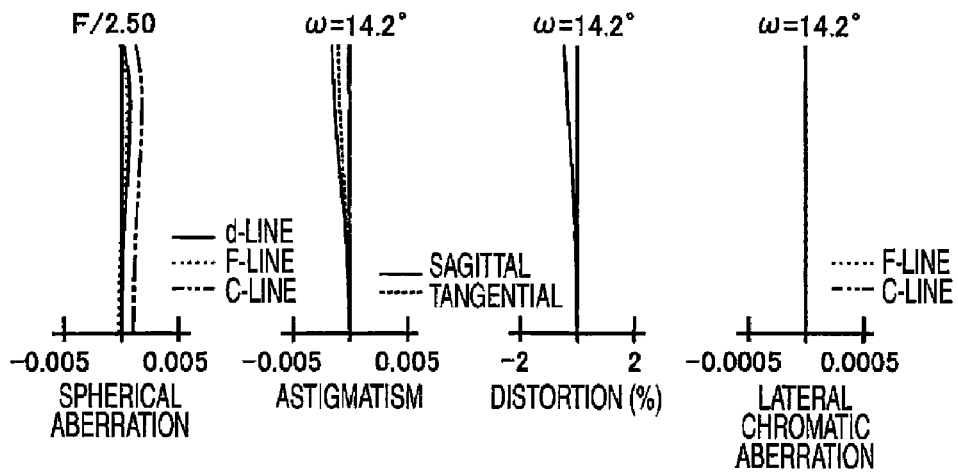

FIG. 15
EXAMPLE 5
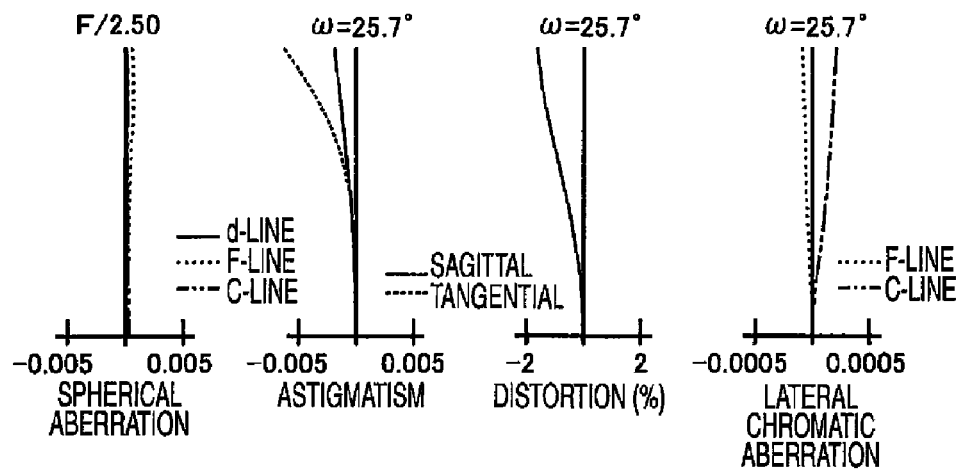
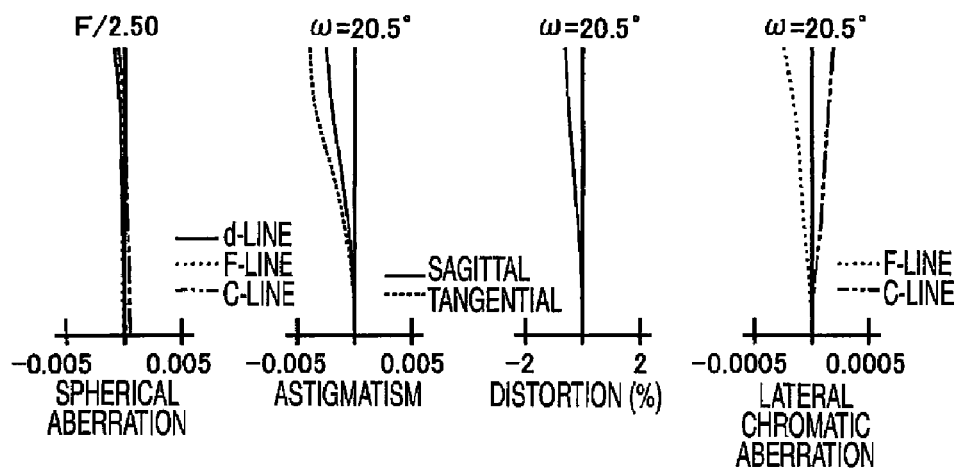
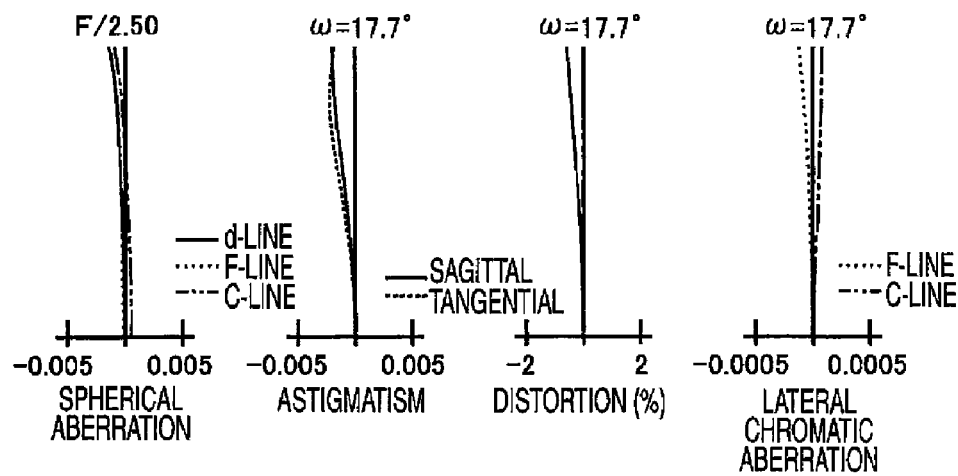

PROJECTION ZOOM LENS AND PROJECTION TYPE DISPLAY DEVICE

This application is based on and claims priority under 35 U.S.C §119 from Japanese Patent Application No. 2007-304317, filed on Nov. 26, 2007, the entire disclosure of which is herein incorporated by reference.

BACKGROUND OF THE INVENTION

1. Field of the Invention

The present invention relates a projection zoom lens of a 5-group configuration and 3-group movement mounted on a projection type display device or the like and a projection type display device having the projection zoom lens, and more particularly, to a projection zoom lens and a projection type display device suitable for projecting on the large screen in a movie theater or the like.

2. Description of Related Art

A projector device (projection type display device) having a relatively long back focal length using a light valve such as a liquid crystal display and a DMD display has come into wide use (see JP-A-8-201690).

Recently, in movie theaters, a projector that is suitable for a large screen and is capable of projecting a higher-precision picture has been used as such a projector device.

A reflection type liquid crystal display element or a DMD 3-sheet type is used for the projector device provided for such a use, and a longer back focal length and telecentricity as satisfactory as the other projectors are necessary.

Generally, a value obtained by dividing a projection distance by a screen width is referred to as a throw ratio. A screen size and a distance from a screen to a projection room, that is, a projection distance are various according to movie theaters. Accordingly, to project a picture with a proper size for each movie theater, a lens corresponding to each proper throw ratio is necessary, but it is not a good method to actually prepare all lenses corresponding to proper throw ratios in consideration of cost. Thus, this can be addressed by providing a width that can correspond to the throw ratio using a zoom lens.

However, in most of the known lenses for a projector, Fno is changed during zooming.

Generally, Fno on a TELE side is slower than that on a WIDE side. Accordingly, in such a zoom lens, a picture of a movie theater with a high throw ratio gets dark even in movie theaters having the same screen size.

As a zoom ratio of a lens gets higher, a wide usability of the lens gets higher. However, in the known lens for a projector, as a zoom ratio gets higher, a variable of Fno gets larger. Accordingly, the lens is not suitable for a movie theater.

To address that the lens is not suitable for a movie theater since Fno is varied according to change of the zoom ratio, there has been proposed a lens described in JP-A-2002-122782.

Since the lens described in JP-A-2002-122782 is a varifocal lens, telecentricity is not kept constantly during power-varying and an operation is complicated when power-varying is necessary after installation.

SUMMARY OF THE INVENTION

An object of an illustrative, non-limiting embodiment of the invention is to provide a telecentric projection zoom lens and a projection type display device having a proper back focal length, having constant Fno during zooming, and having a high zoom ratio and high compatibility.

According to an aspect of the invention, there is provided a projection zoom lens including, in order from a magnification side thereof: a first lens group having a positive refractive power and adapted to perform focusing with being fixed during power-varying of the zoom lens; a second lens group having a negative refractive power and adapted to move during the power-varying; a third lens group having a negative refractive power and adapted to move during the power-varying; a fourth lens group having a positive refractive power and adapted to move during the power-varying; and a fifth lens group having a positive refractive power and adapted to be fixed during the power-varying. Further, a stop fixed during the power-varying is provided between the fourth lens group and the fifth lens group, and a reduction side of the zoom lens is configured to be telecentric. Furthermore, Fno is constant in the whole region of the power-varying, and the following conditional expression (1) is satisfied $$1.7 < Bf/f < 3.0 \qquad (1)$$

where f is a focal length of the whole lens system (i.e., the zoom lens) at a wide angle end, and Bf is a back focal length of the whole lens system (air conversion distance).

The "stop" may include a variable aperture diaphragm having a variable diameter, in addition to a so-called aperture diaphragm having a fixed diameter.

Each lens may be formed of a single lens.

The following conditional expression (2) may be satisfied:

$$4.0 < f1/f < 7.0 \qquad (2)$$

where f1 is a focal length of the first lens group.

The following conditional expression (3) may be satisfied:

$$1.8 < f5/f < 2.2 \qquad (3)$$

where f5 is a focal length of the fifth lens group.

A lens closest to the magnification side in the fifth lens group may be a negative lens, and the following conditional expressions (4) and (5) may be satisfied:

$$1.8 < N51 \qquad (4)$$

$$34 < v51 \qquad (5)$$

where N51 is a refractive index of the lens closest to the magnification side in the fifth lens group at the d-line, and v51 is an Abbe number of the lens closest to the magnification side in the fifth lens group at the d-line.

All the positive lenses in the fifth lens group may satisfy the following conditional expression (6):

$$60 < v5P \qquad (6)$$

where v5P is an Abbe number of the positive lens of the fifth lens group at the d-line.

In addition, according to an aspect of the invention, there is provided a projection type display device including: a light source; a light valve; and the projection zoom lens as a projection lens for projecting an optical image onto a screen by light modulated by the light valve.

BRIEF DESCRIPTION OF THE DRAWINGS

The features of the invention will appear more fully upon consideration of the exemplary embodiment of the invention, which are schematically set forth in the drawings, in which:

FIG. 8 is a diagram illustrating movement positions of lens groups at a wide angle end (WIDE), a middle position (MIDDLE), and a telephoto end (TELE) of the projection zoom lens according to Example 4;

FIG. 10 is a diagram illustrating movement positions of lens groups at a wide angle end (WIDE), a middle position (MIDDLE), and a telephoto end (TELE) of the projection zoom lens according to Example 5;

FIG. 11 is aberration diagrams of the projection zoom lens according to Example 1;

FIG. 12 is aberration diagrams of the projection zoom lens according to Example 2;

FIG. 13 is aberration diagrams of the projection zoom lens according to Example 3;

FIG. 14 is aberration diagrams of the projection zoom lens according to Example 4;

FIG. 15 is aberration diagrams of the projection zoom lens according to Example 5;

DETAILED DESCRIPTION OF THE EXEMPLARY EMBODIMENTS

In a projection zoom lens and a projection type display device using the same according to an exemplary embodiment of the invention, the 5-group configuration and 3-group movement type zoom lens includes, in order from the magnification side, the first lens group having a positive refractive power and performing focusing with being fixed during power-varying; the second lens group and the third lens group having negative refractive powers; the fourth lens group having a positive refractive power; and the fifth lens group having a positive refractive power and fixed during the power-varying. As described above, since the first lend group for focusing is the positive lens group, it is easy to keep a high zoom ratio, and it is possible to fix the reduction side of the stop during power-varying. Accordingly, it is possible to keep the Fno of the system constant in the whole power-varying region.

Therefore, in the case where the projection zoom lens is used in a large projection space such as a movie theater, even when a projection lens only for each projection distance according to the size of the theater is not used, it is possible to widely cope with the situation using one projection lens in a range, and it is possible to project a picture having the same size onto a screen with the same brightness in any movie theater.

Using the aforementioned high zoom ratio, it is possible to project a picture having a length-width radio varied according to zooming with only the width changed, while keeping a height constant.

Since the back focal length of the whole system is set within an intended range, it is possible to secure a space suitable for inserting a glass block as color composing units such as a cross dichroic prism and a TIR prism.

In addition, according to the projection zoom lens and the projection type display device, it is possible to satisfy the demand that telecentricity of the lens system on the reduction side is good.

Figure 1:
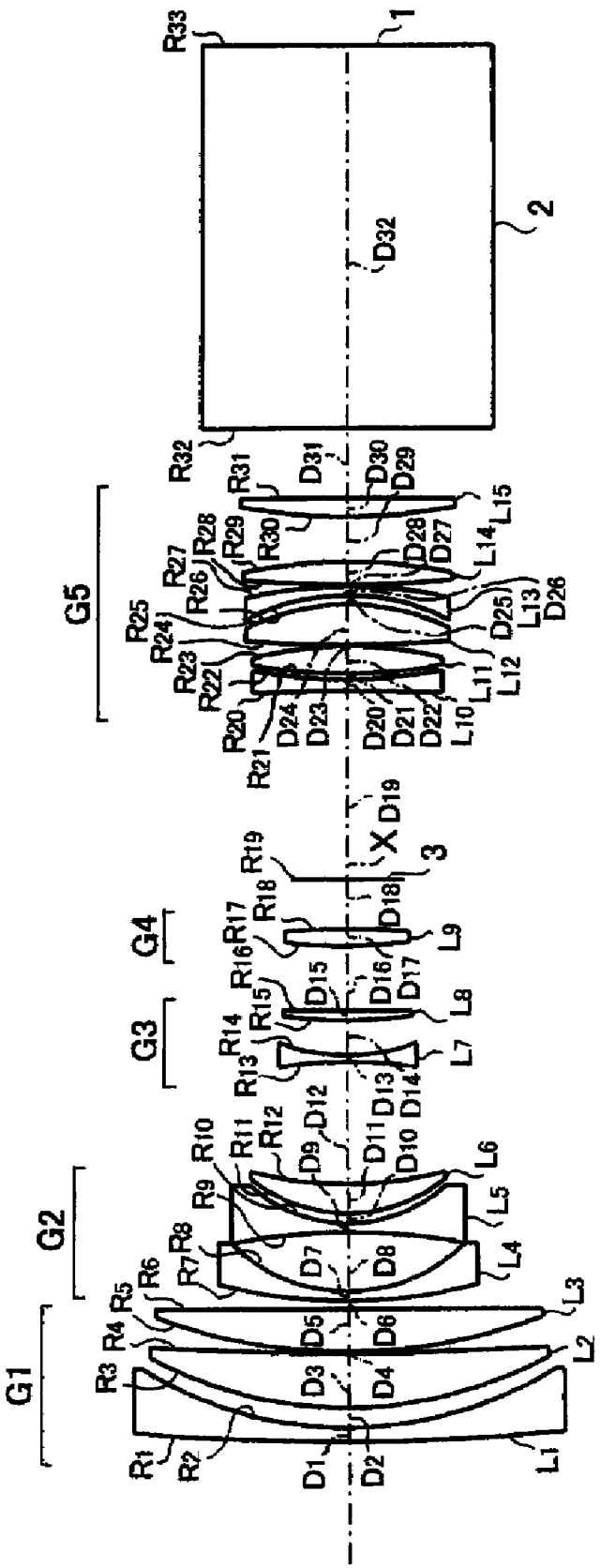
FIG. 1 is a diagram illustrating a projection zoom lens according to Example 1.
Figure 2:
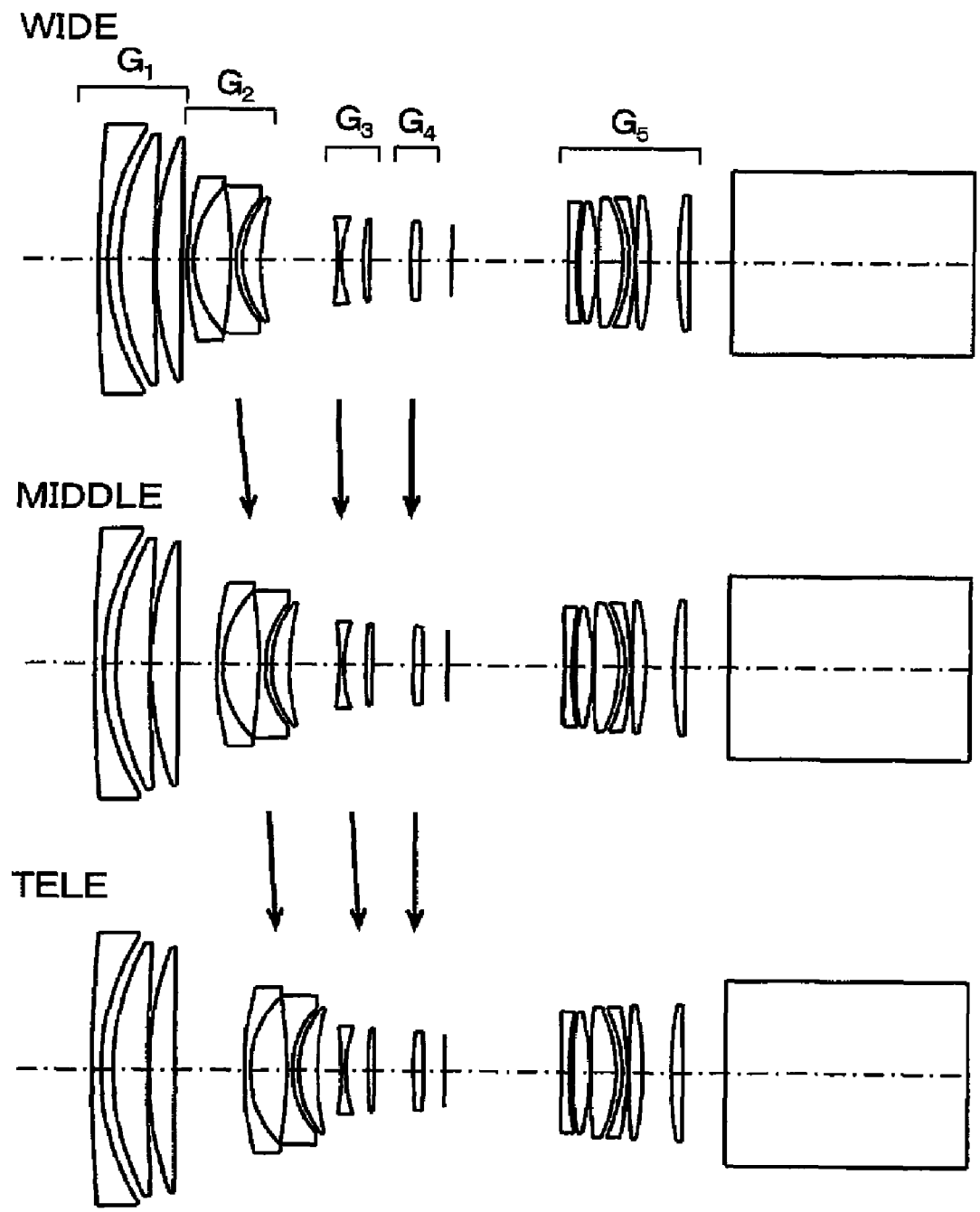
FIG. 2 is a diagram illustrating movement positions of lens groups at a wide angle end (WIDE), a middle position (MIDDLE), and a telephoto end (TELE) of the projection zoom lens according to Example 1.

Hereinafter, an exemplary embodiment of the invention will be described with reference to the drawings. FIG. 1 is a diagram illustrating a zoom lens according to Example 1 at a wide angle end, and FIG. 2 is a diagram illustrating a movement trace of the zoom lens according to Example 1 by power-varying. Hereinafter, the embodiment will be described by considering this lens as a representative example.

That is, this lens is used as a projection zoom lens mounted on a projection type display device for projecting a digital image in a movie theater or the like. The lens includes, in order from a magnification side, a first lens group $G_1$ having a positive refractive power and having a focusing function with being fixed during power-varying of the system; a second lens group $G_2$ having a negative refractive power, a third lens group $G_3$ having a negative refractive power, and a fourth lens group $G_4$ having a positive refractive power, which are moved with correlation for continuous power-varying and correction of shift of an image surface caused by the continuous power-varying; and a fifth lens group $G_5$ having a positive refractive power and fixed during the power-varying.

As shown in FIG. 1, the first lens group $G_1$ includes three lenses $L_1$ to $L_3$, the second lens group $G_2$ includes three lenses $L_4$ to $L_6$, the third lens group $G_3$ includes two lenses $L_7$ and $L_8$, the fourth lens group $G_4$ includes one lens $L_9$, and the fifth lens group $G_5$ includes six lenses $L_{10}$ to $L_{15}$.

An aperture diaphragm 3 that is a real aperture diaphragm is disposed between the fourth lens group $G_4$ and the fifth lens group $G_5$, and the aperture diaphragm 3 is fixed during the power-varying.

Therefore, a reduction side of the aperture diaphragm 3 is configured to be fixed during the power-varying. That is, since the reduction side of the aperture diaphragm 3 is fixed even during the power-varying, speed (Fno) of the lens system is kept constant irrespective of a zooming position. Accordingly, even when a projection distance is varied according to movie theaters as a case where the lens is mounted on a projection type display device used to show a movie in a movie theater, the second lens group $G_2$, the third lens group $G_3$, and the fourth lens group $G_4$ are moved along an optical axis to perform a power-varying operation, and the first lens group $G_1$ is moved along the optical axis to perform focusing, and thus it is possible to projecting a picture with good image quality onto a large screen with the same brightness as required.

That is, Fno (speed) is constant in the whole zooming region.

In addition, a value obtained by dividing a back focal length Bf (air conversion distance) of the lens system by a focal length f of the lens system at a wide angle end satisfies the following conditional expression (1).

$$1.7 < Bf/f < 3.0 \quad (1)$$

Accordingly, in the projection zoom lens according to the embodiment, since the back focal length of the lens system is set to satisfy the conditional expression (1), it is possible to secure a space suitable for inserting a glass block as a color composing unit such as a cross dichroic prism and a TIR prism.

The first lens group $G_1$ preferably includes a first lens $L_1$ of a negative meniscus lens having a convex surface on the magnification side, and a second lens $L_2$ and a third lens $L_3$ formed of a positive lens having a convex surface on the magnification side.

The second lens group $G_2$ preferably includes a fourth lens $L_4$ of a negative meniscus lens having a convex surface on the magnification side, a fifth lens $L_5$ of a biconcave lens, and a sixth lens $L_6$ of a positive lens having a convex surface on the magnification side.

The third lens group $G_3$ preferably includes a seventh lens $L_7$ of a biconcave lens, and an eighth lens $L_8$ formed of a positive lens having a convex surface on the magnification side.

The fourth lens group $G_4$ preferably includes a ninth lens $L_9$ of one biconvex lens.

The fifth lens group $G_5$ includes, in order from the magnification side, a tenth lens $L_{10}$ of a biconcave lens, an eleventh lens $L_{11}$ and a twelfth lens $L_{12}$ of a biconvex lens, a thirteenth lens $L_{13}$ of a negative meniscus lens having a convex surface on the reduction side, a fourteenth lens $L_{14}$ of a biconvex lens, and a fifteenth lens $L_{15}$ of a positive lens having a convex surface on the magnification side.

In the embodiment as described above, a cemented lens is not provided, and all lenses are single lenses. The reason is that a device according to the embodiment is configured to output very strong light of about 2 kW using a xenon lamp or the like as a light source, differently from a device for home use or small-scale meeting, and thus adhesives for cementing lenses may seriously deteriorate by such strong light. That is, the reason is to prevent decrease in performance of the lens in such a point.

In the embodiment, during power-varying, the second lens group $G_2$, the third lens group $G_3$, and the fourth lens group $G_4$ are configured to be moved along the optical axis as shown in FIG. 2. However, with respect to any one or all of the moving lens groups, a zooming position at the telephoto end may be closer to the magnification side than a zooming position at the wide angle end.

In addition, the fifth lens group $G_5$ is a relay lens fixed during power-varying, a color composing prism 2 is disposed between the fifth lens group $G_5$ and a liquid crystal display panel 1. In the figures, X denotes an optical axis.

The projection zoom lens preferably satisfies the following conditional expressions (2) to (6).

$$4.0 < f1/f < 7.0 \quad (2)$$

$$1.8 < f5/f < 2.2 \quad (3)$$

$$1.8 < N51 \quad (4)$$

$$34 < \nu 51 \quad (5)$$

$$60 < \nu 5P \quad (6)$$

where
f1: a focal length of the first lens group $G_1$
f5: a focal length of the fifth lens group $G_5$ N51: a refractive index of the lens closest to the magnification side in the fifth lens group $G_5$ at the d-line.
$\nu 51$: an Abbe number of the lens closest to the magnification side in the fifth lens group $G_5$ at the d-line.
$\nu 5P$: an Abbe number of the positive lens of the fifth lens group $G_5$ at the d-line.

Next, technical meanings of the conditional expressions (1) to (6) will be described.

As described above, the conditional expression (1) is to prescribe a proper range of a back focal length to insert a glass block for color composition such as a dichroic prism and a TIR prism, when considering an effect to the size of the whole device. Particularly, the lower limit is a minimum back focal length necessary for inserting the glass block for color composition.

The conditional expression (2) is to prescribe power of the first lens group $G_1$. That is, the conditional expression (2) is to prescribe a range to prevent a diameter of the lens from being large, and to make all aberrations satisfactory. When the value is larger than the upper limit of the conditional expression (2), the diameter of the lens becomes large and thus correction of distortion or the like is insufficient. When the size of the lens is tried to be small, a power balance with the other group deteriorates, and thus it is difficult to correct aberrations. When the value is smaller than the lower limit, the aberration occurs too large in the first lens group $G_1$, and a load of the second lens group $G_2$ becomes too large.

The conditional expression (3) is to prescribe power of the fifth lens group $G_5$. That is, the conditional expression (3) is to prescribe a range to prevent a diameter of the lens from being large, and to make all aberrations satisfactory. When the value is larger than the upper limit of the conditional expression (3), the diameter of the lens becomes large. When the size of the lens is tried to be small, a power balance with the other group deteriorates, and thus it is difficult to correct aberrations. When the value is smaller than the lower limit, the aberration occurs too large in the fifth lens group $G_5$, and a lens diameter of the first lens group $G_1$ becomes too large.

The conditional expression (4) is to prescribe a range of a refractive index of the lens closest to the magnification side at the d-line in the fifth lens group $G_5$. An aberration (particularly, spherical aberration) can be satisfactorily corrected by the high refractive index satisfying the conditional expression (4) while having a necessary negative refractive index. That is, when the value is larger than the lower limit, it is possible to reduce the aberration occurring in the movement lens group during power-varying.

The conditional expression (5) is to prescribe a range of an Abbe number of the lens closest to the magnification side at the d-line in the fifth lens group $G_5$. A chromatic aberration can be satisfactorily corrected by the large Abbe number satisfying the condition expression (5). That is, when the value is larger than the lower limit, it is possible to keep both of a longitudinal chromatic aberration and a lateral chromatic aberration satisfactory during power-varying.

All aberrations including a chromatic aberration can be satisfactorily corrected by satisfying all of the conditional expressions (4) and (5).

The conditional expression (6) is to prescribe a range of an Abbe number of the positive lens of the fifth lens group $G_5$ at the d-line. A chromatic aberration, particularly, a lateral chromatic aberration can be satisfactorily corrected by the large Abbe number satisfying the conditional expression (6). That is, when the value is larger than the lower limit, it is possible to keep a chromatic aberration satisfactory during zooming.

In the embodiment, brightness is prescribed by the aperture diaphragm 3 having the constant diameter. However, in the projection zoom lens, a variable aperture diaphragm may be used instead of the aperture diaphragm 3. When the aperture diameter is fixed, it is not easy to prevent relative illumination from decreasing at both of the wide angle end and the telephoto end. However, it is possible to easily keep Fno constant even at any one of the wide angle end and the telephoto end by using such a variable aperture diaphragm.

Figure 16:
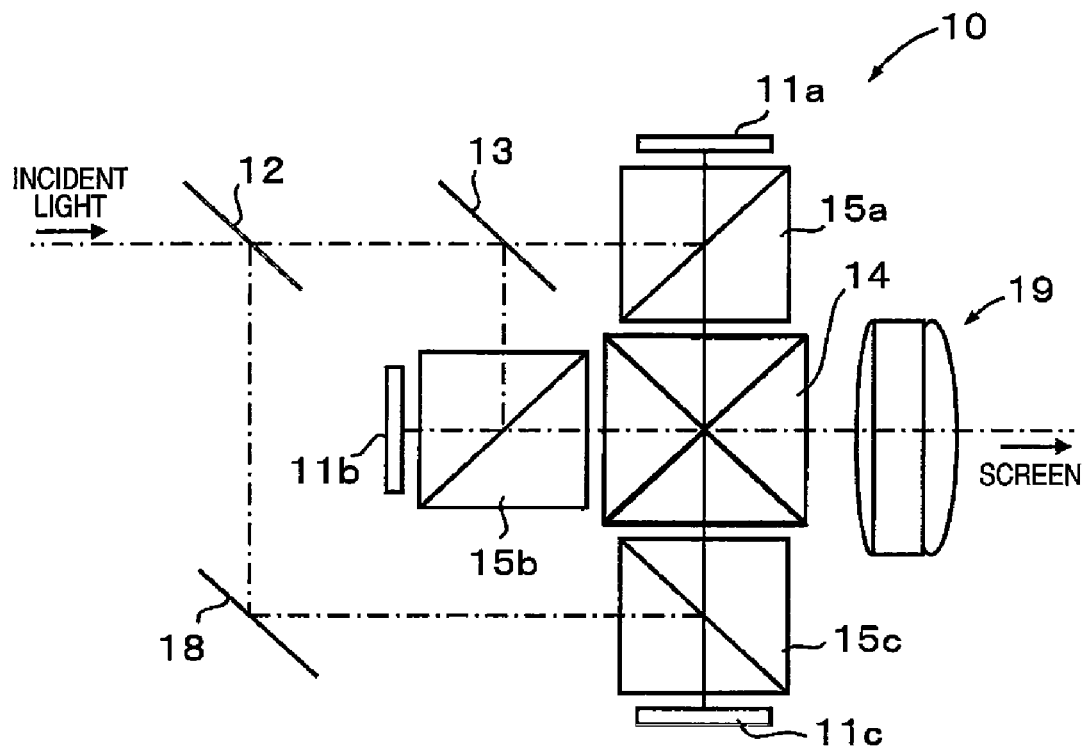
FIG. 16 is a schematic diagram illustrating a part of a projection type display device according to an exemplary embodiment of the invention.

A projection type display device according to the embodiment includes a light source, a reflection type liquid crystal display device, and the projection zoom lens according to the embodiment. A projection zoom lens according to the embodiment in the device serves as a projection lens for projecting an optical image of light modulated by the reflection type liquid crystal display device onto a screen. For example, as shown in FIG. 16, the device is provided with an illumination optical system 10. The illumination optical system 10 includes reflection type liquid crystal display devices 11a to 11c corresponding to colors of light, dichroic mirrors 12 and 13 for color split, a cross dichroic prism 14 for color composition, a total reflection mirror 18, and polarization split prisms 15a to 15c. A light source (not shown) is disposed at the front end of the dichroic mirror 12, white light enters the liquid crystal panels 11a to 11c corresponding to three color light beams (G light, B light, R light) from the light source. Then, the light is optically modulated and is projected to a screen (not shown) by the projection zoom lens 19 according to the embodiment.

Figure 17:
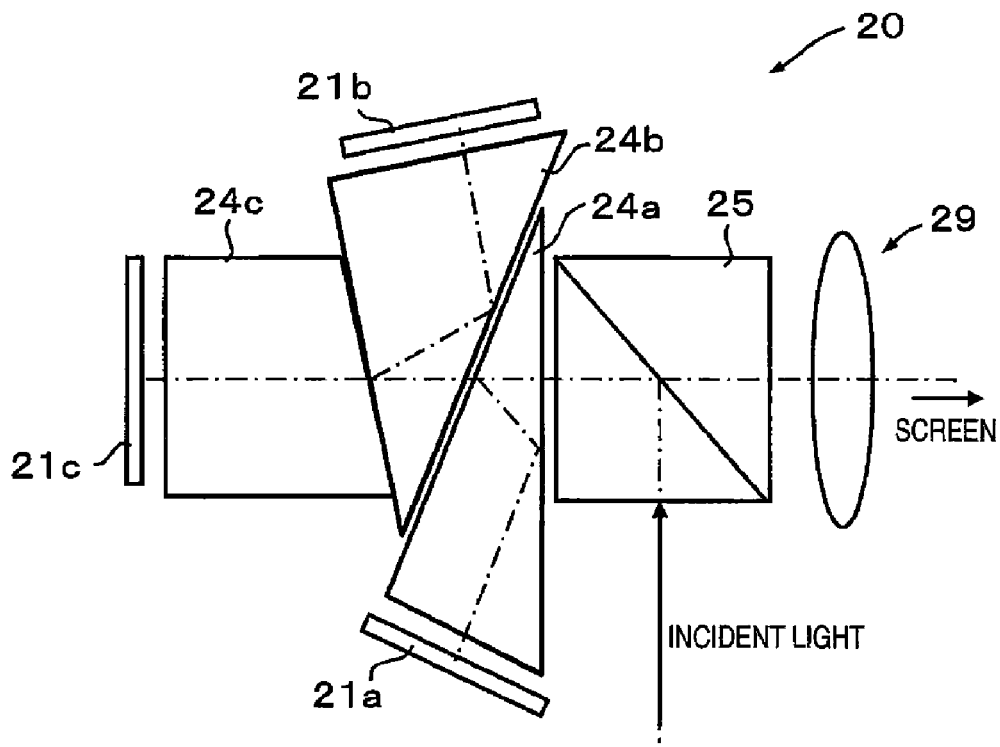
FIG. 17 is a schematic diagram illustrating a part of another projection type display device according to an exemplary embodiment of the invention.

As shown in FIG. 17, a device according to another embodiment is provided with an illumination optical system 20. The illumination optical system 20 includes reflection type liquid crystal display devices 21a to 21c corresponding to colors of light, TIR prisms 24a to 24c for color split and color composition, and a polarization split prism 25. Although the front end of the polarization split prism 25 is not shown, white light enters the liquid crystal panels 21a to 21c corresponding to three color light beams (G light, B light, R light) from the light source. Then, the light is optically modulated and is projected to a screen (not shown) by the projection zoom lens 29 according to the embodiment.

As described above, in the embodiment, for continuous power-varying of the projection zoom lens and correction of shift of an image surface caused by the continuous power-varying, the negative second lens group $G_2$, the negative third lens group $G_3$, and the positive fourth lens group $G_4$ are moved with correlation. Accordingly, it is possible to reduce a distance for zooming movement.

A projection zoom lens of the invention may be variously modified. For example, the number of lenses of each lens group, a radius of curvature of each lens, and a lens distance (or lens thickness) may be appropriately modified.

In addition, it is effective to use a lens of the invention as a projection zoom lens of a projection type display device using a reflection type liquid crystal display panel, but the invention is not limited to the use. The lens may be used as a projection zoom lens using the other optical modulation means such as a projection zoom lens of a device using a transmission type liquid crystal display panel and DMD.

EXAMPLES

Hereinafter, examples will be described in detail with reference to data.

Example 1

A projection zoom lens according to Example 1 has a configuration shown in FIG. 1 as described above. That is, the lens includes, in order from a magnification side, a first lens group $G_1$ including a first lens $L_1$ of a negative meniscus lens having a convex surface on the magnification side, a second lens $L_2$ of a positive meniscus lens having a convex surface on the magnification side, and a third lens $L_3$ of a plano-convex lens having a convex surface on the magnification side; a second lens group $G_2$ including a fourth lens $L_4$ of a negative meniscus lens having a convex surface on the magnification side, a fifth lens $L_5$ of a biconcave lens, a sixth lens $L_6$ of a positive meniscus lens having a convex surface on the magnification side; and a third lens group $G_3$ including a seventh lens $L_7$ of a biconcave lens and an eighth lens $L_8$ of a plano-convex lens having a convex surface on the magnification side.

A fourth lens group $G_4$ includes only a ninth lens $L_9$ of a biconvex lens. A fifth lens group $G_5$ includes a tenth lens $L_{10}$ of a biconcave lens, an eleventh lens $L_{11}$ of a biconvex lens, a twelfth lens $L_{12}$ of a biconvex lens, a thirteenth lens $L_{13}$ of a negative meniscus lens having a convex surface on the reduction side, a fourteenth lens $L_{14}$ of a biconvex lens, and a fifteenth lens $L_{15}$ of a biconvex lens. An aperture diaphragm 3 is disposed between the fourth lens group $G_4$ and the fifth lens group $G_5$, and is fixed during power-varying.

FIG. 2 shows movement positions of the lens groups at a wide angle end (WIDE), a middle position (MIDDLE), and a telephoto end (TELE), according to a power-varying operation, in the projection zoom lens of Example 1.

A radius of curvature R (standardized that a focal length of a conjugation point position infinity state on the magnification side at the wide angle end is 1.00; hereinafter, the same in the following tables) of each lens surface in Example 1, a center thickness of each lens, an air space D between lenses (standardized by the same focal length as the radius of curvature R; hereinafter, the same in the following tables), a refractive index N of each lens at the d-line, and an Abbe number ν are shown in Table 1. In Tables 1, 2, 3, 4, and 5, numerals corresponding to signs R, D, N, and ν increase in order from the magnification side.

In addition, at the wide angle end (WIDE: zoom ratio 1.00), the middle position (MIDDLE: zoom ratio 1.183), and the telephoto end (TELE: zoom ratio 1.400), a distance $D_6$ (variable 1) between the first lens group $G_1$ and the second lens group $G_2$, a distance $D_{12}$ (variable 2) between the second lens group $G_2$ and the third lens group $G_3$, a distance $D_{16}$ (variable 3) between the third lens group $G_3$ and the fourth lens group $G_4$, and a distance $D_{18}$ (variable 4) between the fourth lens group $G_4$ and the fifth lens group $G_5$ are shown in the middle of Table 1.

TABLE 1

| Surface | R | D | Nd | νd |
|---|---|---|---|---|
| 1 | 15.0889 | 0.0875 | 1.80518 | 25.4 |
| 2 | 2.4438 | 0.1197 | | |
| 3 | 2.5985 | 0.3392 | 1.78590 | 44.2 |
| 4 | 22.1825 | 0.0068 | | |
| 5 | 3.4228 | 0.2623 | 1.78590 | 44.2 |
| 6 | ∞ | Variable 1 | | |
| 7 | 3.1024 | 0.0602 | 1.49700 | 81.6 |
| 8 | 1.0215 | 0.3665 | | |
| 9 | −3.9881 | 0.0545 | 1.49700 | 81.6 |
| 10 | 0.9041 | 0.0618 | | |
| 11 | 0.9505 | 0.1820 | 1.72916 | 54.7 |
| 12 | 2.3695 | Variable 2 | | |
| 13 | −2.9320 | 0.0391 | 1.62041 | 60.3 |
| 14 | 1.1885 | 0.2185 | | |
| 15 | 2.8190 | 0.0619 | 1.71300 | 53.9 |
| 16 | ∞ | Variable 3 | | |
| 17 | 3.5909 | 0.0994 | 1.80518 | 25.4 |

TABLE 1-continued

| 18 | | −6.8763 | Variable 4 | | |
|---|---|---|---|---|---|
| 19 | Aperture diaphragm | ∞ | 1.1609 | | |
| 20 | | −17.7257 | 0.0759 | 1.80400 | 46.6 |
| 21 | | 3.1158 | 0.0344 | | |
| 22 | | 3.2657 | 0.1734 | 1.49700 | 81.6 |
| 23 | | −2.3866 | 0.0071 | | |
| 24 | | 7.3812 | 0.2529 | 1.49700 | 81.6 |
| 25 | | −1.4253 | 0.0579 | | |
| 26 | | −1.3622 | 0.0536 | 1.80518 | 25.4 |
| 27 | | −2.8456 | 0.0068 | | |
| 28 | | 6.8156 | 0.1416 | 1.49700 | 81.6 |
| 29 | | −3.2576 | 0.2799 | | |
| 30 | | 3.8328 | 0.1148 | 1.51633 | 64.1 |
| 31 | | −37.8948 | 0.4763 | | |
| 32 | | ∞ | 2.3000 | 1.68893 | 31.1 |
| 33 | | ∞ | | | |

| Zoom Ratio | Variable 1 | Variable 2 | Variable 3 | Variable 4 |
|---|---|---|---|---|
| 1.000 (WIDE) | 0.0510 | 0.7576 | 0.4022 | 0.3084 |
| 1.183 (MIDDLE) | 0.3795 | 0.4941 | 0.4004 | 0.2453 |
| 1.400 (TELE) | 0.6824 | 0.2415 | 0.3861 | 0.2092 |

| Conditional Expression (1) | 1.835 | Conditional Expression (2) | 4.248 | Conditional Expression (3) | 1.903 |
|---|---|---|---|---|---|
| Conditional Expression (4) | 1.804 | Conditional Expression (5) | 46.6 | Conditional Expression (6) | 81.6, 64.1 |

Values corresponding to the conditional expressions (1) to (6) in Example 1 are shown in the lower part of Table 1.

FIG. 11 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 1. In FIG. 11, and FIGS. 12 to 15, the spherical aberration diagrams represent aberration curves at the d-line, F-line, and C-line. In the figures, aberrations with respect to a sagittal image surface and a tangential image surface are shown in the astigmatism diagrams, and aberrations at the F-line and C-line with respect to the d-line are shown in the lateral chromatic aberrations diagrams.

As shown in the spherical aberration diagrams of FIG. 11, Fno is constant as 2.80 at the wide angle end (WIDE), the middle position (MIDDLE), and the telephoto end (TELE).

As can be seen from FIG. 11 and Table 1, aberrations are satisfactorily corrected in the whole zoom region by the projection zoom lens of Example 1. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.400. Accordingly, a range of projection distance capable of coping is wide.

Example 2

Figure 3:
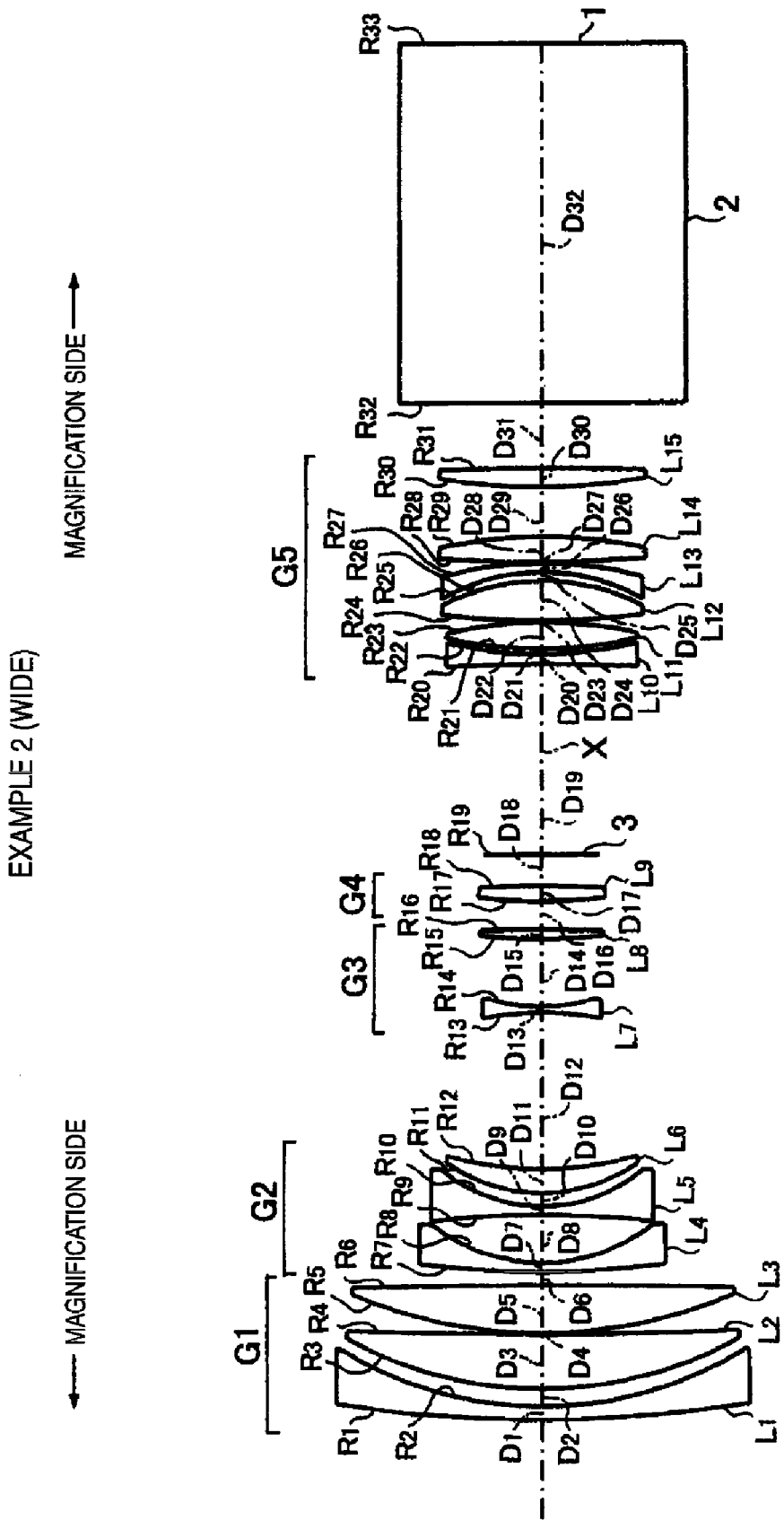
FIG. 3 is a diagram illustrating a projection zoom lens according to Example 2.

A projection zoom lens according to Example 2 has a configuration as shown in FIG. 3. The projection zoom lens basically has a configuration similar to that of Example 1, but is different in that the third lens $L_3$ and the eighth lens $L_8$ are a biconvex lens.

Figure 4:
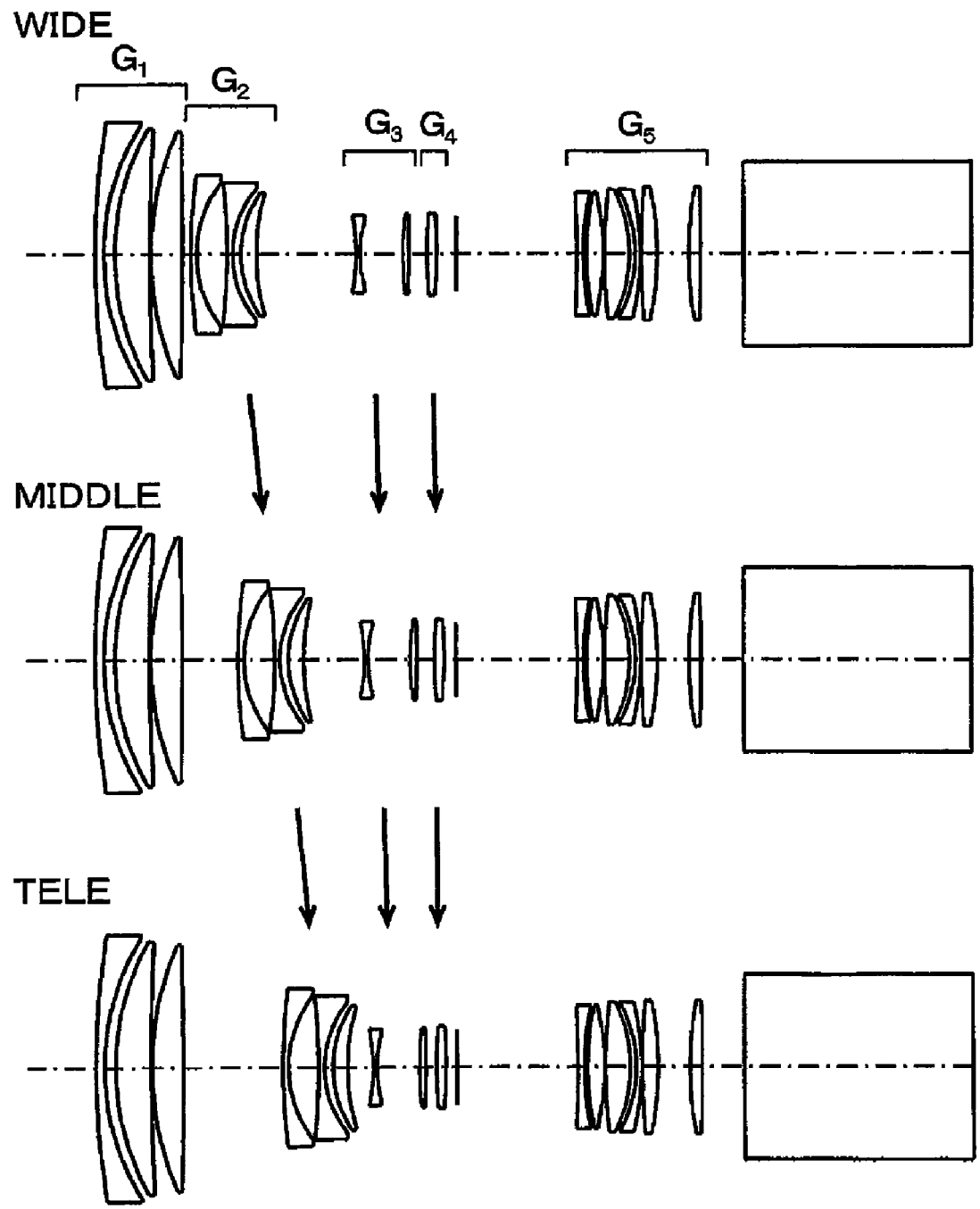
FIG. 4 is a diagram illustrating movement positions of lens groups at a wide angle end (WIDE), a middle position (MIDDLE), and a telephoto end (TELE) of the zoom lens according to Example 2.

FIG. 4 shows movement positions of the lens groups at a wide angle end (WIDE), a middle position (MIDDLE), and a telephoto end (TELE), according to a power-varying operation, in the projection zoom lens of Example 2.

A radius of curvature R of each lens surface in Example 2, a center thickness of each lens, an air space D between lenses, a refractive index N of each lens at the d-line, and an Abbe number ν are shown in Table 2.

In addition, at the wide angle end (WIDE: zoom ratio 1.00), the middle position (MIDDLE: zoom ratio 1.273), and the telephoto end (TELE: zoom ratio 1.640), a distance $D_6$ (variable 1) between the first lens group $G_1$ and the second lens group $G_2$, a distance $D_{12}$ (variable 2) between the second lens group $G_2$ and the third lens group $G_3$, a distance $D_{16}$ (variable 3) between the third lens group $G_3$ and the fourth lens group $G_4$, and a distance $D_{18}$ (variable 4) between the fourth lens group $G_4$ and the fifth lens group $G_5$ are shown in the middle of Table 2.

TABLE 2

| Surface | | R | D | Nd | νd |
|---|---|---|---|---|---|
| 1 | | 8.0236 | 0.0846 | 1.80518 | 25.4 |
| 2 | | 2.4021 | 0.1098 | | |
| 3 | | 2.5188 | 0.3442 | 1.48749 | 70.2 |
| 4 | | 27.5114 | 0.0065 | | |
| 5 | | 3.0105 | 0.3037 | 1.80610 | 40.9 |
| 6 | | −54.5766 | Variable 1 | | |
| 7 | | 5.7105 | 0.0578 | 1.49700 | 81.5 |
| 8 | | 1.1335 | 0.2980 | | |
| 9 | | −5.8525 | 0.0535 | 1.49700 | 81.5 |
| 10 | | 0.9863 | 0.0846 | | |
| 11 | | 1.0456 | 0.1485 | 1.77250 | 49.6 |
| 12 | | 2.1641 | Variable 2 | | |
| 13 | | −1.9120 | 0.0369 | 1.51680 | 64.2 |
| 14 | | 1.2238 | 0.4200 | | |
| 15 | | 3.2026 | 0.0616 | 1.83400 | 37.2 |
| 16 | | −13.2687 | Variable 3 | | |
| 17 | | 3.9876 | 0.0963 | 1.64769 | 33.8 |
| 18 | | −5.6819 | Variable 4 | | |
| 19 | Aperture diaphragm | ∞ | 1.1919 | | |
| 20 | | −12.0023 | 0.0630 | 1.80400 | 46.6 |
| 21 | | 2.4821 | 0.0341 | | |
| 22 | | 2.6795 | 0.1670 | 1.49700 | 81.5 |
| 23 | | −2.6795 | 0.0065 | | |
| 24 | | 4.6806 | 0.2531 | 1.49700 | 81.5 |
| 25 | | −1.3691 | 0.0550 | | |
| 26 | | −1.2992 | 0.0518 | 1.80518 | 25.4 |
| 27 | | −2.5630 | 0.0065 | | |
| 28 | | 8.4831 | 0.1586 | 1.49700 | 81.5 |
| 29 | | −3.2931 | 0.3159 | | |
| 30 | | 3.7703 | 0.1177 | 1.48749 | 70.2 |
| 31 | | −22.0184 | 0.4553 | | |
| 32 | | ∞ | 2.1800 | 1.68893 | 31.1 |
| 33 | | ∞ | | | |

| Zoom Ratio | Variable 1 | Variable 2 | Variable 3 | Variable 4 |
|---|---|---|---|---|
| 1.000 (WIDE) | 0.0828 | 0.9840 | 0.1774 | 0.1958 |
| 1.273 (MIDDLE) | 0.5495 | 0.5966 | 0.1706 | 0.1234 |
| 1.640 (TELE) | 0.9772 | 0.2493 | 0.1065 | 0.1070 |

| Conditional Expression (1) | 1.743 | Conditional Expression (2) | 4.226 | Conditional Expression (3) | 1.995 |
|---|---|---|---|---|---|
| Conditional Expression (4) | 1.804 | Conditional Expression (5) | 46.6 | Conditional Expression (6) | 81.5, 70.2 |

Values corresponding to the conditional expressions (1) to (6) in Example 2 are shown in the lower part of Table 2.

FIG. 12 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 2.

As shown in the spherical aberration diagrams of FIG. 12, Fno is constant as 2.80 at the wide angle end (WIDE), the middle position (MIDDLE), and the telephoto end (TELE).

As can be seen from FIG. 12 and Table 2, aberrations are satisfactorily corrected in the whole zoom region by the projection zoom lens of Example 2. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.640. Accordingly, a range of projection distance capable of coping is wide.

Example 3

Figure 5:
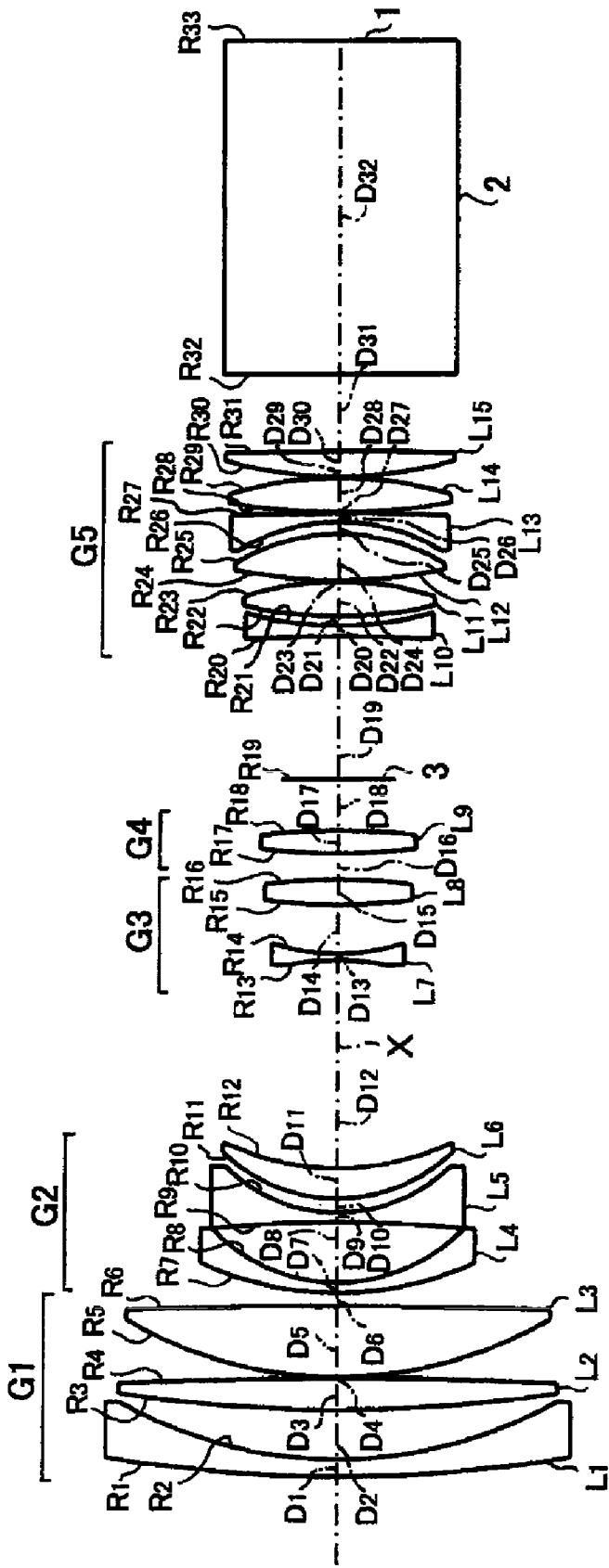
FIG. 5 is a diagram illustrating a projection zoom lens according to Example 3.

A projection zoom lens according to Example 3 has a configuration as shown in FIG. 5. The projection zoom lens basically has a configuration similar to that of Example 2, but is different in that the second lens $L_3$ is a biconvex lens.

Figure 6:
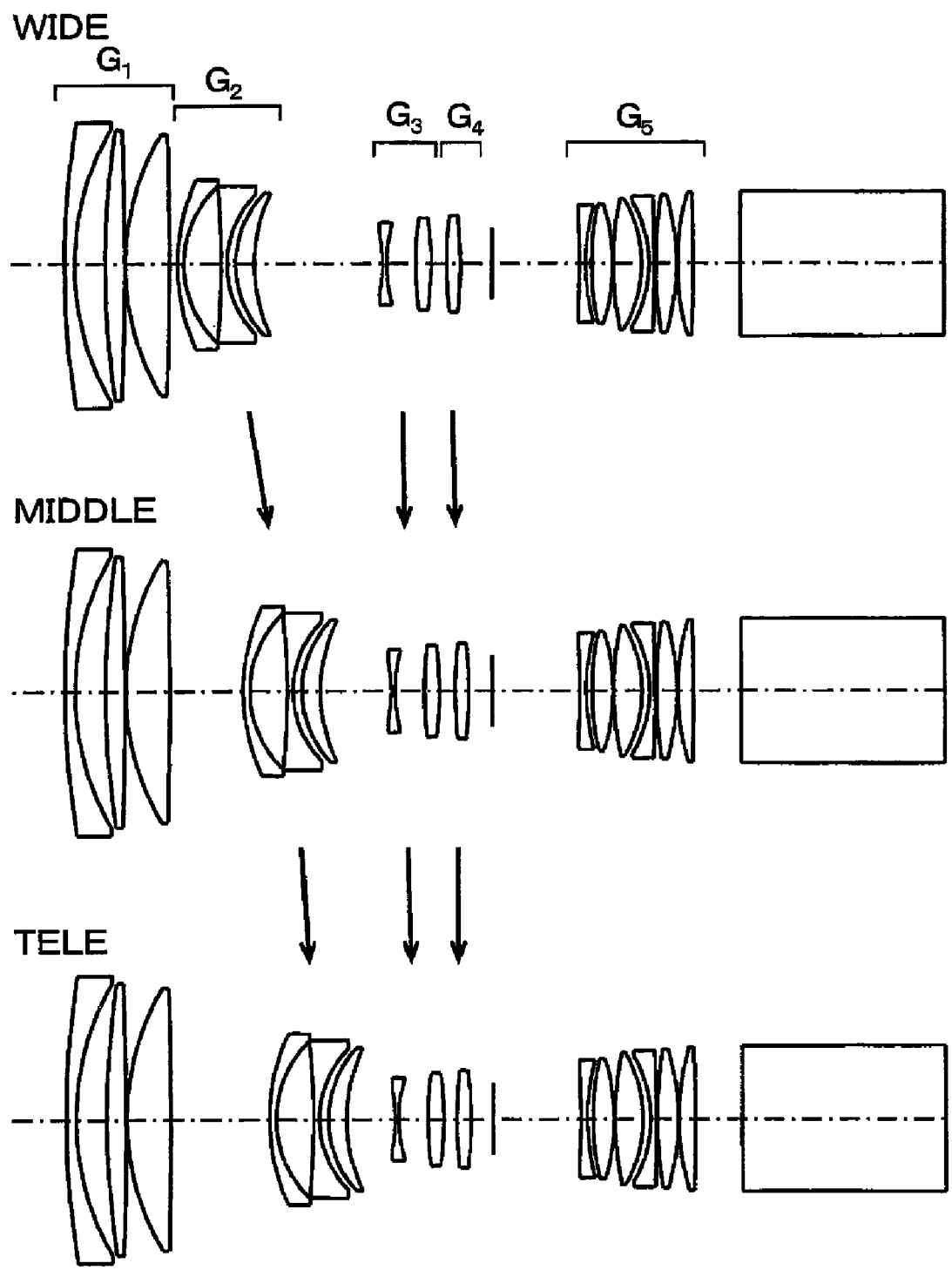
FIG. 6 is a diagram illustrating movement positions of lens groups at a wide angle end (WIDE), a middle position (MIDDLE), and a telephoto end (TELE) of the projection zoom lens according to Example 3.

FIG. 6 shows movement positions of the lens groups at a wide angle end (WIDE), a middle position (MIDDLE), and a telephoto end (TELE), according to a power-varying operation, in the projection zoom lens of Example 3.

A radius of curvature R of each lens surface in Example 3, a center thickness of each lens, an air space D between lenses, a refractive index N of each lens at the d-line, and an Abbe number ν are shown in Table 3.

In addition, at the wide angle end (WIDE: zoom ratio 1.00), the middle position (MIDDLE: zoom ratio 1.368), and the telephoto end (TELE: zoom ratio 1.563), a distance $D_6$ (variable 1) between the first lens group $G_1$ and the second lens group $G_2$, a distance $D_{12}$ (variable 2) between the second lens group $G_2$ and the third lens group $G_3$, a distance $D_{16}$ (variable 3) between the third lens group $G_3$ and the fourth lens group $G_4$, and a distance $D_{18}$ (variable 4) between the fourth lens group $G_4$ and the fifth lens group $G_5$ are shown in the middle of Table 3.

TABLE 3

| Surface | R | D | Nd | νd |
|---|---|---|---|---|
| 1 | 10.7768 | 0.1282 | 1.80518 | 25.4 |
| 2 | 3.3732 | 0.3811 | | |
| 3 | 11.0403 | 0.2439 | 1.48749 | 70.4 |
| 4 | −41.5513 | 0.0086 | | |
| 5 | 3.1963 | 0.5398 | 1.77250 | 49.6 |
| 6 | −63.2413 | Variable 1 | | |
| 7 | 2.5034 | 0.0812 | 1.49700 | 81.5 |
| 8 | 1.3460 | 0.4613 | | |
| 9 | −10.5895 | 0.0726 | 1.49700 | 81.5 |
| 10 | 1.2308 | 0.1115 | | |
| 11 | 1.2724 | 0.2318 | 1.77250 | 49.6 |
| 12 | 2.0210 | Variable 2 | | |
| 13 | −1.7519 | 0.0484 | 1.71300 | 53.9 |
| 14 | 1.7519 | 0.3700 | | |
| 15 | 4.2362 | 0.1963 | 1.80518 | 25.4 |
| 16 | −4.2362 | Variable 3 | | |
| 17 | 4.7461 | 0.1735 | 1.51680 | 64.2 |
| 18 | −5.7329 | Variable 4 | | |
| 19 Aperture diaphragm | ∞ | 1.1006 | | |
| 20 | −9.9132 | 0.0826 | 1.83481 | 42.7 |
| 21 | 2.7212 | 0.0704 | | |
| 22 | 3.3538 | 0.2667 | 1.49700 | 81.5 |
| 23 | −2.4165 | 0.0086 | | |
| 24 | 3.9504 | 0.3544 | 1.49700 | 81.5 |
| 25 | −1.5961 | 0.0935 | | |
| 26 | −1.5279 | 0.0684 | 1.64769 | 33.8 |
| 27 | −19.4870 | 0.0086 | | |
| 28 | 5.0905 | 0.2655 | 1.49700 | 81.5 |
| 29 | −3.0003 | 0.0086 | | |
| 30 | 3.1609 | 0.1989 | 1.48749 | 70.4 |
| 31 | −36.6159 | 0.5950 | | |
| 32 | ∞ | 2.5600 | 1.51633 | 64.1 |
| 33 | ∞ | | | |

| Zoom Ratio | Variable 1 | Variable 2 | Variable 3 | Variable 4 |
|---|---|---|---|---|
| 1.000 (WIDE) | 0.1045 | 1.6029 | 0.1984 | 0.3908 |
| 1.368 (MIDDLE) | 0.9246 | 0.8877 | 0.1949 | 0.2895 |
| 1.563 (TELE) | 1.2401 | 0.6102 | 0.1702 | 0.2762 |

| | | | | | |
|---|---|---|---|---|---|
| Conditional Expression (1) | 2.282 | Conditional Expression (2) | 5.899 | Conditional Expression (3) | 2.119 |
| Conditional Expression (4) | 1.835 | Conditional Expression (5) | 42.7 | Conditional Expression (6) | 81.5, 70.4 |

Values corresponding to the conditional expressions (1) to (6) in Example 3 are shown in the lower part of Table 3.

FIG. 13 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 3.

As shown in the spherical aberration diagrams of FIG. 13, Fno is constant as 2.50 at the wide angle end (WIDE), the middle position (MIDDLE), and the telephoto end (TELE).

As can be seen from FIG. 13 and Table 3, aberrations are satisfactorily corrected in the whole zoom region by the projection zoom lens of Example 3. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.563. Accordingly, a range of projection distance capable of coping is wide.

Example 4

Figure 7:
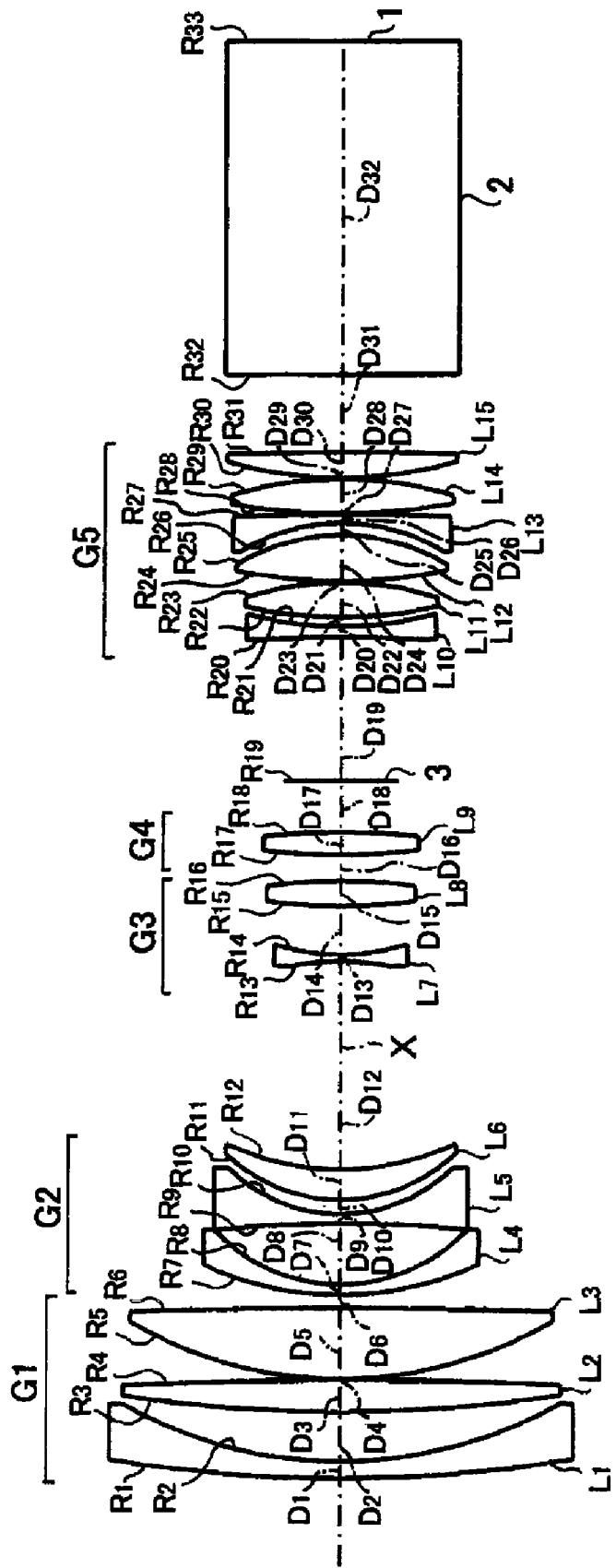
FIG. 7 is a diagram illustrating a projection zoom lens according to Example 4.

A projection zoom lens according to Example 4 has a configuration as shown in FIG. 7. The projection zoom lens basically has a configuration similar to that of Example 1, but is different in that the second lens $L_2$ is a plano-convex lens having a convex surface on the magnification side, the eighth lens $L_8$ is a biconvex lens, and the fifteenth lens $L_{15}$ is a plano-convex lens having a convex surface on the magnification side.

FIG. 8 shows movement positions of the lens groups at a wide angle end (WIDE), a middle position (MIDDLE), and a telephoto end (TELE), according to a power-varying operation, in the projection zoom lens of Example 4.

A radius of curvature R of each lens surface in Example 4, a center thickness of each lens, an air space D between lenses, a refractive index N of each lens at the d-line, and an Abbe number ν are shown in Table 4.

In addition, at the wide angle end (WIDE: zoom ratio 1.00), the middle position (MIDDLE: zoom ratio 1.368), and the telephoto end (TELE: zoom ratio 1.640), a distance $D_6$ (variable 1) between the first lens group $G_1$ and the second lens group $G_2$, a distance $D_{12}$ (variable 2) between the second lens group $G_2$ and the third lens group $G_3$, a distance $D_{16}$ (variable 3) between the third lens group $G_3$ and the fourth lens group $G_4$, and a distance $D_{18}$ (variable 4) between the fourth lens group $G_4$ and the fifth lens group $G_5$ are shown in the middle of Table 4.

TABLE 4

| Surface | | R | D | Nd | vd |
|---|---|---|---|---|---|
| 1 | | 6.4977 | 0.1057 | 1.80518 | 25.4 |
| 2 | | 2.8426 | 0.2863 | | |
| 3 | | 8.4296 | 0.1783 | 1.51680 | 64.2 |
| 4 | | ∞ | 0.0071 | | |
| 5 | | 2.5961 | 0.4015 | 1.72916 | 54.7 |
| 6 | | ∞ | Variable 1 | | |
| 7 | | 2.3221 | 0.0670 | 1.49700 | 81.5 |
| 8 | | 1.0680 | 0.3384 | | |
| 9 | | −11.3254 | 0.0599 | 1.49700 | 81.5 |
| 10 | | 0.9685 | 0.0924 | | |
| 11 | | 1.0176 | 0.1983 | 1.72916 | 54.7 |
| 12 | | 1.9295 | Variable 2 | | |
| 13 | | −1.8102 | 0.0399 | 1.58144 | 40.7 |
| 14 | | 1.4949 | 0.4939 | | |
| 15 | | 3.9943 | 0.1811 | 1.80518 | 25.4 |
| 16 | | −5.1325 | Variable 3 | | |
| 17 | | 4.0411 | 0.1715 | 1.71300 | 53.9 |
| 18 | | −12.5857 | Variable 4 | | |
| 19 | Aperture diaphragm | ∞ | 1.2143 | | |
| 20 | | −3.8982 | 0.0681 | 1.83400 | 37.2 |
| 21 | | 2.6850 | 0.0503 | | |
| 22 | | 3.1841 | 0.1950 | 1.49700 | 81.5 |
| 23 | | −1.9886 | 0.0071 | | |
| 24 | | 2.6932 | 0.3462 | 1.49700 | 81.5 |
| 25 | | −1.3351 | 0.0722 | | |
| 26 | | −1.2841 | 0.0564 | 1.64769 | 33.8 |
| 27 | | −4.1987 | 0.0047 | | |
| 28 | | 5.3500 | 0.1515 | 1.48749 | 70.2 |
| 29 | | −5.3500 | 0.0047 | | |
| 30 | | 2.7493 | 0.1477 | 1.48749 | 70.2 |
| 31 | | ∞ | 0.4907 | | |
| 32 | | ∞ | 2.1100 | 1.51633 | 64.1 |
| 33 | | ∞ | | | |

| Zoom Ratio | Variable 1 | Variable 2 | Variable 3 | Variable 4 |
|---|---|---|---|---|
| 1.000 (WIDE) | 0.0827 | 1.0584 | 0.1553 | 0.2700 |
| 1.368 (MIDDLE) | 0.7824 | 0.4731 | 0.1131 | 0.1979 |
| 1.640 (TELE) | 1.1361 | 0.1961 | 0.0241 | 0.2102 |

| Conditional Expression (1) | 1.881 | Conditional Expression (2) | 4.968 | Conditional Expression (3) | 1.997 |
|---|---|---|---|---|---|
| Conditional Expression (4) | 1.834 | Conditional Expression (5) | 37.2 | Conditional Expression (6) | 81.5, 70.2 |

Values corresponding to the conditional expressions (1) to (6) in Example 4 are shown in the lower part of Table 4.

FIG. 14 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 4.

As shown in the spherical aberration diagrams of FIG. 14, Fno is constant as 2.50 at the wide angle end (WIDE), the middle position (MIDDLE), and the telephoto end (TELE).

As can be seen from FIG. 14 and Table 4, aberrations are satisfactorily corrected in the whole zoom region by the projection zoom lens of Example 4. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.640. Accordingly, a range of projection distance capable of coping is wide.

Example 5

Figure 9:
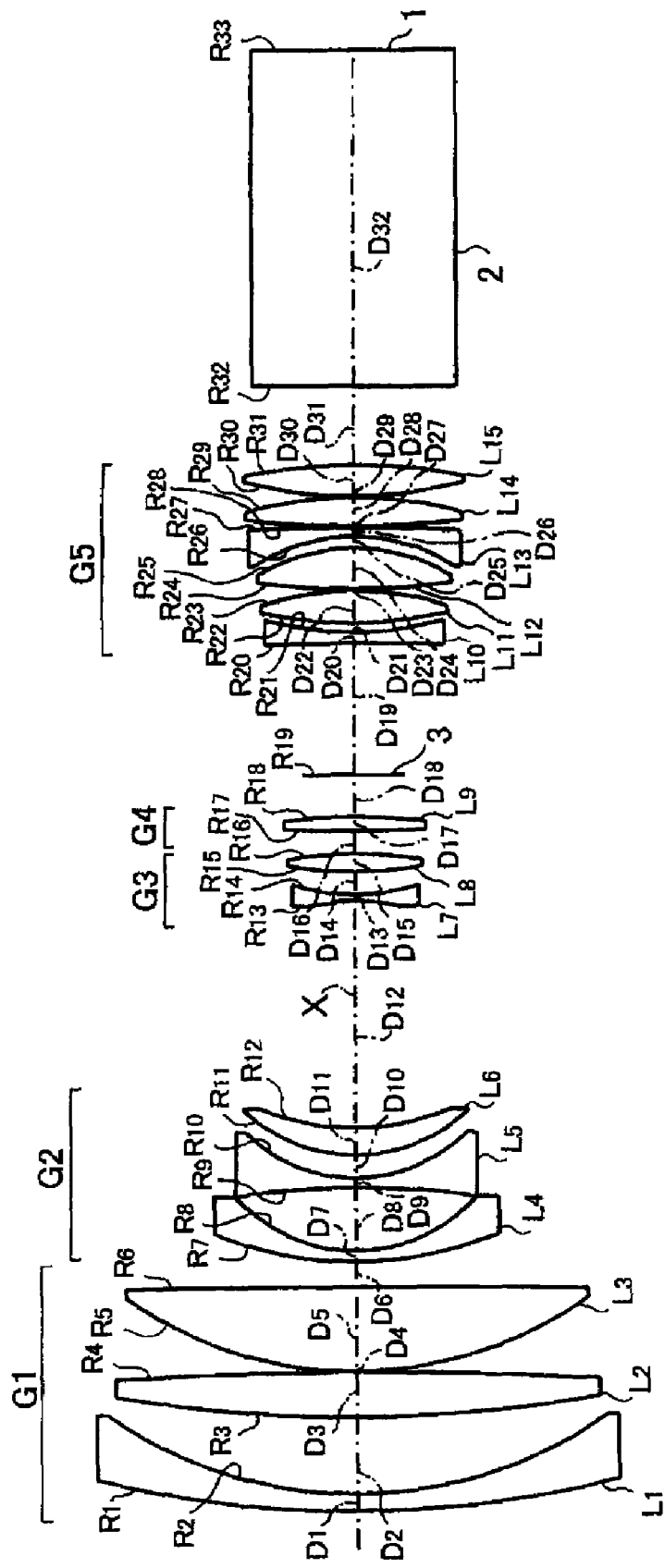
FIG. 9 is a diagram illustrating a projection zoom lens according to Example 5.

A projection zoom lens according to Example 5 has a configuration as shown in FIG. 9. The projection zoom lens basically has a configuration similar to that of Example 3. FIG. 10 shows movement positions of the lens groups at a wide angle end (WIDE), a middle position (MIDDLE), and a telephoto end (TELE), according to a power-varying operation, in the projection zoom lens of Example 5.

A radius of curvature R of each lens surface in Example 5, a center thickness of each lens, an air space D between lenses, a refractive index N of each lens at the d-line, and an Abbe number ν are shown in Table 5.

In addition, at the wide angle end (WIDE: zoom ratio 1.00), the middle position (MIDDLE: zoom ratio 1.270), and the telephoto end (TELE: zoom ratio 1.490), a distance $D_6$ (variable 1) between the first lens group $G_1$ and the second lens group $G_2$, a distance $D_{12}$ (variable 2) between the second lens group $G_2$ and the third lens group $G_3$, a distance $D_{16}$ (variable 3) between the third lens group $G_3$ and the fourth lens group $G_4$, and a distance $D_{18}$ (variable 4) between the fourth lens group $G_4$ and the fifth lens group $G_5$ are shown in the middle of Table 5.

TABLE 5

| Surface | | R | D | Nd | vd |
|---|---|---|---|---|---|
| 1 | | 9.5756 | 0.1479 | 1.80518 | 25.4 |
| 2 | | 3.8294 | 0.6755 | | |
| 3 | | 12.7237 | 0.3868 | 1.51633 | 64.1 |
| 4 | | −40.4661 | 0.0099 | | |
| 5 | | 3.5349 | 0.7330 | 1.71300 | 53.9 |
| 6 | | −181.2686 | Variable 1 | | |
| 7 | | 3.3393 | 0.0936 | 1.49700 | 81.5 |
| 8 | | 1.4274 | 0.5457 | | |
| 9 | | −7.5781 | 0.0838 | 1.49700 | 81.5 |
| 10 | | 1.3799 | 0.2010 | | |
| 11 | | 1.4489 | 0.2412 | 1.80400 | 46.6 |
| 12 | | 2.2745 | Variable 2 | | |
| 13 | | −1.8532 | 0.0559 | 1.77250 | 49.6 |
| 14 | | 1.8532 | 0.1969 | | |
| 15 | | 32.894 | 0.1584 | 1.80518 | 25.4 |
| 16 | | −3.2894 | Variable 3 | | |
| 17 | | 16.0738 | 0.1271 | 1.51680 | 64.2 |
| 18 | | −4.8045 | Variable 4 | | |
| 19 | Aperture diaphragm | ∞ | 1.1548 | | |
| 20 | | −16.9852 | 0.0953 | 1.83481 | 42.7 |
| 21 | | 2.9268 | 0.0815 | | |
| 22 | | 3.7685 | 0.2815 | 1.49700 | 81.5 |
| 23 | | −2.5788 | 0.0099 | | |
| 24 | | 6.1265 | 0.3556 | 1.49700 | 81.5 |
| 25 | | −1.6502 | 0.1027 | | |
| 26 | | −1.6337 | 0.0789 | 1.64769 | 33.8 |
| 27 | | −15.4830 | 0.0099 | | |
| 28 | | 8.8299 | 0.2531 | 1.49700 | 81.5 |
| 29 | | −3.5314 | 0.0099 | | |
| 30 | | 3.9468 | 0.2665 | 1.49700 | 81.5 |
| 31 | | −5.0928 | 0.6861 | | |
| 32 | | ∞ | 2.9500 | 1.51633 | 64.1 |
| 33 | | ∞ | | | |

| Zoom Ratio | Variable 1 | Variable 2 | Variable 3 | Variable 4 |
|---|---|---|---|---|
| 1.000 (WIDE) | 0.2217 | 1.9763 | 0.1971 | 0.3679 |

TABLE 5-continued

| 1.270 (MIDDLE) | 0.8851 | 1.4220 | 0.2693 | 0.1865 |
|---|---|---|---|---|
| 1.490 (TELE) | 1.2881 | 1.0495 | 0.2876 | 0.1378 |

| Conditional Expression (1) | 2.630 | Conditional Expression (2) | 6.292 | Conditional Expression (3) | 2.177 |
|---|---|---|---|---|---|
| Conditional Expression (4) | 1.835 | Conditional Expression (5) | 42.7 | Conditional Expression (6) | 81.5 |

Values corresponding to the conditional expressions (1) to (6) in Example 5 are shown in the lower part of Table 5.

FIG. 15 is aberration diagrams illustrating all aberrations (spherical aberration, astigmatism, distortion, and lateral chromatic aberration) at the wide angle end (WIDE), the middle position (MIDDLE), and the telephoto end (TELE) of the projection zoom lens according to Example 5.

As shown in the spherical aberration diagrams of FIG. 15, Fno is constant as 2.50 at the wide angle end (WIDE), the middle position (MIDDLE), and the telephoto end (TELE).

As can be seen from FIG. 15 and Table 5, aberrations are satisfactorily corrected in the whole zoom region by the projection zoom lens of Example 5. Accordingly, a proper back focal length and a satisfactory telecentricity on the reduction side are achieved, and speed, compactness, width of angle of view, and zoom ratio can be exhibited as the best balance. Particularly, it is possible to keep speed constant in each region of power-varying.

The zoom ratio is set large as 1.490. Accordingly, a range of projection distance capable of coping is wide.

What is claimed is:

1. A zoom lens for projection comprising, in order from a magnification side of the zoom lens:
    a first lens group having a positive refractive power and adapted to perform focusing with being fixed during power-varying of the zoom lens;
    a second lens group having a negative refractive power and adapted to move during the power-varying;
    a third lens group having a negative refractive power and adapted to move during the power-varying;
    a fourth lens group having a positive refractive power and adapted to move during the power-varying;
    a stop adapted to be fixed during the power-varying; and
    a fifth lens group having a positive refractive power and adapted to be fixed during the power-varying,
    wherein a reduction side of the zoom lens is configured to be telecentric,
    Fno is constant in a whole region of the power-varying, and the zoom lens satisfy conditional expression (1):

$1.7 < Bf/f < 3.0$ (1)

wherein f is a focal length of the zoom lens at a wide angle end, and Bf is a back focal length of the zoom lens in air converted distance.

2. The zoom lens according to claim 1, wherein each lens in the zoom lens is a single lens.

3. The zoom lens according to claim 1, satisfying conditional expression (2):

$4.0 < f1/f < 7.0$ (2)

wherein f1 is a focal length of the first lens group.

4. The zoom lens according to claim 1, satisfying conditional expression (3):

$1.8 < f5/f < 2.2$ (3)

wherein f5 is a focal length of the fifth lens group.

5. The zoom lens according to claim 1, wherein a lens closest to the magnification side in the fifth lens group is a negative lens and satisfies conditional expressions (4) and (5):

$1.8 < N51$ (4)

$34 < \nu 51$ (5)

wherein N51 is a refractive index of the lens closest to the magnification side in the fifth lens group at the d-line, and ν51 is an Abbe number of the lens closest to the magnification side in the fifth lens group at the d-line.

6. The zoom lens according to claim 1, wherein all positive lenses in the fifth lens group satisfy conditional expression (6):

$60 < \nu 5P$ (6)

wherein ν5P is an Abbe number of each of the positive lenses of the fifth lens group at the d-line.

7. A projection display device comprising:
    a light source;
    a light valve; and
    a zoom lens according to claim 1 as a projection lens for projecting an optical image onto a screen by light modulated by the light valve.

8. The zoom lens according to claim 2, satisfying conditional expression (2):

$4.0 < f1/f < 7.0$ (2)

wherein f1 is a focal length of the first lens group.

9. The zoom lens according to claim 2, satisfying conditional expression (3):

$1.8 < f5/f < 2.2$ (3)

wherein f5 is a focal length of the fifth lens group.

10. The zoom lens according to claim 2, wherein a lens closest to the magnification side in the fifth lens group is a negative lens and satisfies conditional expressions (4) and (5):

$1.8 < N51$ (4)

$34 < \nu 51$ (5)

wherein N51 is a refractive index of the lens closest to the magnification side in the fifth lens group at the d-line, and ν51 is an Abbe number of the lens closest to the magnification side in the fifth lens group at the d-line.

11. The zoom lens according to claim 2, wherein all positive lenses in the fifth lens group satisfy conditional expression (6):

$60 < \nu 5P$ (6)

wherein ν5P is an Abbe number of each of the positive lenses of the fifth lens group at the d-line.

12. The zoom lens according to claim 3, satisfying conditional expression (3):

$1.8 < f5/f < 2.2$ (3)

wherein f5 is a focal length of the fifth lens group.

13. The zoom lens according to claim 3, wherein a lens closest to the magnification side in the fifth lens group is a negative lens and satisfies conditional expressions (4) and (5):

$1.8 < N51$ (4)

$34 < \nu 51$ (5)

wherein N51 is a refractive index of the lens closest to the magnification side in the fifth lens group at the d-line, and ν51 is an Abbe number of the lens closest to the magnification side in the fifth lens group at the d-line.

14. The zoom lens according to claim 3, wherein all positive lenses in the fifth lens group satisfy conditional expression (6):

$$60 < \nu 5P \qquad (6)$$

wherein ν5P is an Abbe number of each of the positive lenses of the fifth lens group at the d-line.

15. The zoom lens according to claim 4, wherein a lens closest to the magnification side in the fifth lens group is a negative lens and satisfies conditional expressions (4) and (5):

$$1.8 < N51 \qquad (4)$$

$$34 < \nu 51 \qquad (5)$$

wherein N51 is a refractive index of the lens closest to the magnification side in the fifth lens group at the d-line, and ν51 is an Abbe number of the lens closest to the magnification side in the fifth lens group at the d-line.

16. The zoom lens according to claim 4, wherein all positive lenses in the fifth lens group satisfy conditional expression (6):

$$60 < \nu 5P \qquad (6)$$

wherein ν5P is an Abbe number of each of the positive lenses of the fifth lens group at the d-line.

17. The zoom lens according to claim 4, wherein all positive lenses in the fifth lens group satisfy conditional expression (6):

$$60 < \nu 5P \qquad (6)$$

wherein ν5P is an Abbe number of each of the positive lenses of the fifth lens group at the d-line.

* * * * *